US012792811B2

(12) United States Patent
Hulse

(10) Patent No.: US 12,792,811 B2
(45) Date of Patent: Nov. 10, 2026

(54) ANALOGUE CIRCUIT DESIGN

(71) Applicant: Agile Analog Ltd, Cambridgeshire (GB)

(72) Inventor: Michael Hulse, Cambridgeshire (GB)

(73) Assignee: Agile Analog Ltd, Cambridgeshire (GB)

( * ) Notice: Subject to any disclaimer, the term of this patent is extended or adjusted under 35 U.S.C. 154(b) by 644 days.

(21) Appl. No.: 18/267,247

(22) PCT Filed: Nov. 16, 2021

(86) PCT No.: PCT/GB2021/052959
§ 371 (c)(1),
(2) Date: Jun. 14, 2023

(87) PCT Pub. No.: WO2022/136822
PCT Pub. Date: Jun. 30, 2022

(65) Prior Publication Data
US 2024/0061985 A1 Feb. 22, 2024

(30) Foreign Application Priority Data
Dec. 22, 2020 (GB) .................................... 2020382

(51) Int. Cl.
*G06F 30/30* (2020.01)
*G06F 30/367* (2020.01)
(Continued)

(52) U.S. Cl.
CPC .......... *G06F 30/373* (2020.01); *G06F 30/367* (2020.01); *G06F 2111/04* (2020.01); *G06F 2119/18* (2020.01)

(58) Field of Classification Search
None
See application file for complete search history.

(56) References Cited

U.S. PATENT DOCUMENTS 6,968,517 B2 * 11/2005 McConaghy ........... G06F 30/36 716/132
7,139,987 B2 * 11/2006 Zhang ..................... G06F 30/36 716/135

(Continued)

FOREIGN PATENT DOCUMENTS

CN 102521443 A 6/2012
JP 2011070336 A 4/2011

(Continued)

OTHER PUBLICATIONS

Office Action for Taiwan Application No. 110147659, dated Oct. 2, 2025, 16 pages.

(Continued)

*Primary Examiner* — Leigh M Garbowski
(74) *Attorney, Agent, or Firm* — Barnes & Thornburg

(57) ABSTRACT

An analogue circuit design apparatus is disclosed herein. The analogue circuit design apparatus is configured to receive information representing technical requirements for the analogue circuit, wherein the technical requirements comprise (i) at least one circuit performance requirement, and (ii) at least one manufacturing requirement for the analogue circuit to satisfy a specific set of manufacturing process related rules. The analogue circuit design apparatus is configured to identify a plurality of potential analogue circuit design architectures, for satisfying the circuit performance requirement, that will satisfy the at least one manufacturing requirement and select, as a current analogue circuit design architecture, an initial analogue circuit design architecture from among the plurality of potential analogue circuit design architectures, wherein the selection of the initial analogue circuit design is dependent on the set of manufacturing process related rules.

20 Claims, 8 Drawing Sheets

(51) Int. Cl.

| | |
|---|---|
| ***G06F 30/373*** | (2020.01) |
| *G06F 111/04* | (2020.01) |
| *G06F 119/18* | (2020.01) |

(56) References Cited

U.S. PATENT DOCUMENTS

| | | | | |
|---|---|---|---|---|
| 7,761,824 | B2 * | 7/2010 | Chew | G06F 30/398 716/54 |
| 8,271,921 | B2 * | 9/2012 | Nitta | G06F 30/30 716/110 |
| 9,697,317 | B1 * | 7/2017 | Qian | G06F 30/392 |
| 10,706,197 | B2 * | 7/2020 | Li | G06F 30/373 |
| 10,783,292 | B1 * | 9/2020 | Clewes | G06F 30/394 |
| 2003/0093763 | A1 * | 5/2003 | McConaghy | G06F 30/36 716/102 |
| 2004/0010764 | A1 | 1/2004 | Zhang et al. | |
| 2007/0099313 | A1 * | 5/2007 | Hanson | G05B 13/021 438/15 |
| 2008/0163142 | A1 | 7/2008 | White et al. | |
| 2009/0300570 | A1 * | 12/2009 | Chan | G06F 30/39 716/119 |
| 2009/0307638 | A1 * | 12/2009 | Mcconaghy | G06F 30/36 716/100 |
| 2011/0239182 | A1 * | 9/2011 | Nitta | G06F 30/30 716/135 |
| 2020/0394279 | A1 | 12/2020 | Chuang et al. | |

FOREIGN PATENT DOCUMENTS

| | | | |
|---|---|---|---|
| JP | 2019204490 | A | 11/2019 |
| TW | 201732661 | A | 9/2017 |
| WO | 2006013675 | A1 | 2/2006 |

OTHER PUBLICATIONS

Office Action for Japanese Application No. 2023-537959, dated Oct. 7, 2025, 13 pages.

International Search Report and Written Opinion for Application No. PCT/GB2021/052959, 14 pages.

Mingjie Liu, et al., Closing The Design Loop: Bayesian Optimization Assisted Hierarchical Analog Layout Synthesis, ECE Department, The University of Texas at Austin, 2020, 6 pages.

Tonmoy Dhar, et al., ALIGN: A System for Automating Analog Layout, University of Minnesota, Texas A&M University, Intel Labs, Aug. 24, 2020, 7 pages.

Hao Chen, et al., Challenges and Opportunities Toward Fully Automated Analog Layout Design, Department of Electrical and Computer Engineering, The University of Texas at Austin, 2020, 10 pages.

International Search Report for Application No. GB2020382.4, dated May 5, 2021, 4 pages.

Chinese Office Action and Search Report for Application No. 202180092417.3, dated May 15, 2026, 12 pages.

Biying Xu, Hierarchical and Analytical Placement Techniques for High-Performance Analog Circuits, Mar. 2017, 8 pages.

European Patent Office Communication for Application No. 21 815 622.2-1218, dated Sep. 10, 2026, 7 pages.

Gerlach, et al., A Generic Topology Selection Method for Analog Circuits with Embedded Circuit Sizing Demonstrated on the OTA Example, IEEE, 2017, 4 pages.

* cited by examiner

ANALOGUE CIRCUIT DESIGN

This application is a U.S. national stage entry of PCT Application No. PCT/GB2021/052959, filed Nov. 16, 2021, which claims priority to, and the benefit of, GB2020382.4, filed Dec. 22, 2020, the disclosures of which are expressly incorporated herein by reference in their entireties.

FIELD OF THE INVENTION

The present disclosure relates to methods and systems for analogue circuit design, and in particular, methods and systems for automating the design process for analogue circuits.

BACKGROUND

Analogue components cause the most chip production test failures and up to 95% of field failures. While circuit design for digital circuits has become automated to some degree in recent times, the automation of analogue circuit design has proven problematic, not least due to e.g. parasitic effects. Conventional approaches to analogue circuit design might involve "best guess" estimates or specification guard-banding performed manually by engineering teams relying on prior knowledge and experience, often with the result that circuits are over-engineered and inefficient, or prone to failure. There is therefore a desire to create a more efficient and reliable process for designing analogue circuits.

SUMMARY OF THE INVENTION

Aspects of the invention are as set out in the independent claims and optional features are set out in the dependent claims. Aspects of the invention may be provided in conjunction with each other and features of one aspect may be applied to other aspects.

In a first aspect there is provided an analogue circuit design apparatus. The apparatus comprises at least one design unit comprising a processor and a communications interface, the processor being configured to:

(a) control the communications interface to receive information representing technical requirements for the analogue circuit, wherein the technical requirements comprise (i) at least one circuit performance requirement, and (ii) at least one manufacturing requirement for the analogue circuit to satisfy a specific set of manufacturing process related rules;

(b) identify, based on the received information, a plurality of potential analogue circuit design architectures, for satisfying the circuit performance requirement, that will satisfy the at least one manufacturing requirement;

(c) select, as a current analogue circuit design architecture, an initial analogue circuit design architecture from among the plurality of potential analogue circuit design architectures, wherein the selection of the initial analogue circuit design is dependent on the set of manufacturing process related rules;

(d) produce a current design for the analogue circuit that satisfies the current analogue circuit design architecture;

(e) determine, for the current design for the analogue circuit, whether the current design will meet the at least one circuit performance requirement;

in the event that the current design for the analogue circuit is determined not to meet the circuit performance requirement:

(f) select, a further analogue circuit design architecture as the current analogue circuit design architecture, wherein the selection of the further analogue circuit design architecture is dependent on the set of manufacturing process related rules, and (g) repeat steps (d) and (e); and (h) in the event that the current design for the analogue circuit design architecture is determined to meet the circuit performance requirement, output a design for the analogue circuit.

The processor may further be configured to:

(i) determine, for each current design for the analogue circuit, how well the current design meets the at least one circuit performance requirement and the set of manufacturing process related rules;

(j) select, a further analogue circuit design architecture as the current analogue circuit design architecture, wherein the selection of the further analogue circuit design architecture is dependent on the set of manufacturing process related rules, and (k) repeat steps (d) and (e) to produce a plurality of produced analogue circuit designs; and (l) choose and output a design for the analogue circuit from the plurality of produced analogue circuit designs that best meets the at least one circuit performance requirement and the set of manufacturing process related rules.

The selection of the analogue circuit design architecture at step (c) and/or step (f) may be based on a prioritisation of the plurality of potential architectures that creates a prioritised list of potential analogue circuit design architectures that have been determined to meet the set of manufacturing process related rules. The prioritised list of potential analogue circuit design architectures may be determined using a machine learning model.

In some examples the apparatus comprises a primary design unit and a secondary design unit, wherein the primary design unit is configured to:

(m) identify, based on the received information, the plurality of potential analogue circuit design architectures, for satisfying the circuit performance requirement, that will satisfy the manufacturing requirement; and (n) select, as the current analogue circuit design architecture, the initial analogue circuit design architecture from among the plurality of potential analogue circuit design architectures, wherein each circuit design architecture comprises a respective plurality of circuit portions;

(o) determine, for each circuit portion of the plurality of circuit portions, respective circuit performance requirements for that circuit portion, wherein the respective circuit performance requirements for each circuit portion are determined based on the specific set of manufacturing process related rules; and (p) provide the respective circuit performance requirements for each circuit portion to at least one of a plurality of secondary design units;

and wherein each of the plurality of secondary design units of the analogue circuit design apparatus is configured to:

(q) design a respective circuit portion of the plurality of circuit portions based on the circuit performance requirements for that respective circuit portion provided by the primary design unit; and (r) output a resulting initial design of the respective circuit portion;

wherein the primary design unit is further configured to:

(s) receive a respective design for each circuit portion from each of the plurality of secondary design units; and (t) produce the current analogue circuit design for the analogue circuit that satisfies the current analogue circuit design architecture based on the respective designs for each circuit portion.

The primary design unit may be further configured to:

(u) simulate an analogue circuit based on the current analogue circuit design to produce at least one simulation output;

(v) verify whether or not the analogue circuit meets the circuit performance requirement, and when the analogue circuit meets the circuit performance requirement, output the generated design; and when the analogue circuit does not meet the circuit performance requirement:

select, a further analogue circuit design architecture as the current analogue circuit design architecture, wherein the selection of the further analogue circuit design is dependent on the set of manufacturing process related rules; and repeat steps (d) to (e) and (m) to (v).

The primary design unit may further be configured to:

(w) simulate an analogue circuit based on the current analogue circuit design to produce at least one simulation output;

(x) verify whether or not the analogue circuit meets the circuit performance requirement for the analogue circuit, and when the analogue circuit meets the circuit performance requirement, output the generated design; and when the analogue circuit does not meet the circuit performance requirement:

determine, for at least one affected circuit portion of the plurality of circuit portions, revised circuit performance requirements for that affected circuit portion based on the simulation output and the circuit performance requirement;

provide, to at least one corresponding secondary design unit, the revised circuit performance requirements for each affected circuit portion;

receive a respective updated design of each affected circuit portion from the at least one corresponding secondary design unit;

update the current design of the analogue circuit with the respective updated design of each affected circuit portion; and repeat steps (w) to (x) for the updated set of designs.

Each of the plurality of secondary design units may be configured to adapt the design of the respective portion based on the simulated behaviour by adapting the design of the respective portion based on a difference between the simulated behaviour and the circuit performance requirements.

In some examples, after at least an initial design of a given circuit portion has been completed by at least another one of the secondary design units, at least one of the secondary design units is configured to adapt the current analogue circuit design based on a context of its corresponding circuit portion, the context comprising circuit performance requirements generated based on the completed design of the given circuit portion completed by the at least another one of the secondary design units.

In some examples, after at least an initial design of a given circuit portion has been completed by at least another one of the secondary design units, at least one of the secondary design units is configured to adapt its output initial design based on a context of its corresponding circuit portion, the context comprising circuit performance requirements generated based on the completed design of the given circuit portion completed by the at least another one of the secondary design units.

Each of the secondary design units may be configured to repeat the step of adapting the design of a further circuit portion in the event that the modification of the design of another circuit portion of the plurality of circuit portions causes a change of context for that further circuit portion.

Additionally, or alternatively, each of the secondary design units may be configured to repeat the step of adapting the design of a further circuit portion only in the event that the change in context is greater than a selected threshold level of change in context.

In some examples the apparatus is configured to obtain the context by simulating the performance of the given circuit portion.

In another aspect there is provided a method of designing an analogue circuit. The method comprises, at a design unit comprising a processor and a communications interface:

(a) controlling the communications interface to receive information representing technical requirements for the analogue circuit, wherein the technical requirements comprise (i) at least one circuit performance requirement, and (ii) at least one manufacturing requirement for the analogue circuit to satisfy a specific set of manufacturing process related rules;

(b) identifying, based on the received information, a plurality of potential analogue circuit design architectures, for satisfying the circuit performance requirement, that will satisfy the at least one manufacturing requirement;

(c) selecting, as a current analogue circuit design architecture, an initial analogue circuit design architecture from among the plurality of potential analogue circuit design architectures, wherein the selection of the initial analogue circuit design is dependent on the set of manufacturing process related rules;

(d) producing a current design for the analogue circuit that satisfies the current analogue circuit design architecture;

(e) determining, for the current design for the analogue circuit design architecture, whether the current design will meet the at least one circuit performance requirement; in the event that the current design for the analogue circuit design architecture is determined not to meet the circuit performance requirement:

(f) selecting, a further analogue circuit design architecture as the current analogue circuit design architecture, wherein the selection of the further analogue circuit design architecture is dependent on the set of manufacturing process related rules, and (g) repeating steps (d) and (e); and (h) in the event that the current design for the analogue circuit design architecture is determined to meet the circuit performance requirement, outputting a design for the analogue circuit.

The method may further comprise:

(i) determining, for the current design for the analogue circuit, how well the current design meets the at least one circuit performance requirement and the set of manufacturing process related rules;

(j) selecting, a further analogue circuit design architecture as the current analogue circuit design architecture, wherein the selection of the further analogue circuit design architecture is dependent on the set of manufacturing process related rules, and (k) repeating steps (d) and (e) to produce a plurality of produced analogue circuit designs; and (l) choosing and outputting a design for the analogue circuit from the plurality of produced analogue circuit designs that best meets the at least one circuit performance requirement and the set of manufacturing process related rules.

The selection of the analogue circuit design architecture at step (c) and/or step (f) may be based on a prioritisation of the plurality of potential architectures that creates a prioritised list of potential analogue circuit design architectures that have been determined to meet the set of manufacturing process related rules The method may further comprise:

at a primary design unit:

(m) identifying, based on the received information, the plurality of potential analogue circuit design architectures, for satisfying the circuit performance requirement, that will satisfy the manufacturing requirement; and (n) selecting, as the current analogue circuit design architecture, the initial analogue circuit design architecture from among the plurality of potential analogue circuit design architectures, wherein each circuit design architecture comprises a respective plurality of circuit portions;

(o) determining, for each circuit portion of the plurality of circuit portions, respective circuit performance requirements for that circuit portion, wherein the respective circuit performance requirements for each circuit portion are determined based on the specific set of manufacturing process related rules; and (p) providing the respective circuit performance requirements for each circuit portion to at least one of a plurality of secondary design units;

at each of the plurality of secondary design units:

(q) designing a respective circuit portion of the plurality of circuit portions based on the circuit performance requirements for that respective circuit portion provided by the primary design unit; and (r) outputting a resulting initial design of the respective circuit portion;

further comprising, at the primary design unit:

(s) receiving a respective design for each circuit portion from each of the plurality of secondary design units; and (t) producing the current analogue circuit design for the analogue circuit that satisfies the current analogue circuit design architecture based on the respective designs for each circuit portion.

The method may further comprise, at the primary design unit:

(u) simulating an analogue circuit based on the current analogue circuit design to produce at least one simulation output;

(v) verifying whether or not the analogue circuit meets the t circuit performance requirement, and when the analogue circuit meets the circuit performance requirement, outputting the generated design; and when the analogue circuit does not meet the circuit performance requirement:

selecting, a further analogue circuit design architecture as the current analogue circuit design architecture, wherein the selection of the further analogue circuit design [is based on a prioritisation of the plurality of potential architectures that] is dependent on the set of manufacturing process related rules; and repeating steps (d) to (e) and (m) to (v).

The method may further comprise, at the primary design unit:

(w) simulating an analogue circuit based on the current analogue circuit design to produce at least one simulation output;

(x) verifying whether or not the analogue circuit meets the circuit performance requirement for the analogue circuit, and when the analogue circuit meets the circuit performance requirement, outputting the generated design; and when the analogue circuit does not meet the circuit performance requirement:

determining, for at least one affected circuit portion of the plurality circuit portions, revised circuit performance requirements for that affected circuit portion based on the simulation output and the circuit performance requirement;

providing, to at least one corresponding secondary design unit, the revised circuit performance requirements for each affected circuit portion;

receiving a respective updated design of each affected circuit portion from the at least one corresponding secondary design unit;

updating the set of designs with the respective updated design of each affected circuit portion; and repeating steps (w) to (x) for the updated set of designs.

The method may further comprise adapting, at each of the plurality of secondary design units, the design of the respective portion based on the simulated behaviour by adapting the design of the respective portion based on a difference between the simulated behaviour and the circuit performance requirements.

The method may further comprise adapting, after at least an initial design of a given circuit portion has been completed by at least another one of the secondary design units, the output initial design of at least one of the secondary design units based on a context of its corresponding circuit portion, the context comprising circuit performance requirements generated based on the completed design of the given circuit portion completed by the at least another one of the secondary design units.

The method may further comprise adapting, after at least an initial design of a given circuit portion has been completed by at least another one of the secondary design units, the output initial design of at least one of the secondary design units based on a context of its corresponding circuit portion, the context comprising circuit performance requirements generated based on the completed design of the given circuit portion completed by the at least another one of the secondary design units.

The method may further comprise repeating, at each of the secondary design units, the step of adapting the design of a further circuit portion in the event that the modification of the design of another circuit portion of the plurality of circuit portions causes a change of context for that further circuit portion.

2 The method may further comprise repeating, at each of the secondary design units, the step of adapting the design of a further circuit portion only in the event that the change in context is greater than a selected threshold level of change in context. In some examples the context is obtained by simulating the performance of the given circuit portion.

It will be understood that the method may further comprise fabricating an analogue circuit to the output design.

In another aspect there is provided a computer readable non-transitory storage medium comprising a program for a computer configured to cause a processor to perform any of the methods described above.

DRAWINGS

Embodiments of the disclosure will now be described, by way of example only, with reference to the accompanying drawings, in which.

SPECIFIC DESCRIPTION

Figure 1A:
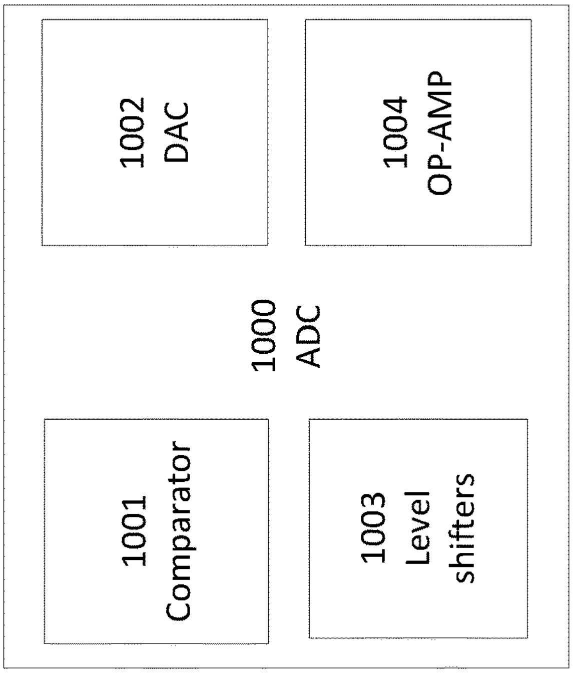
FIG. 1A shows a functional schematic diagram of an example analogue circuit.

FIG. 1A shows a simplified functional schematic of an example analogue electronic circuit, which in this example is an analogue-to-digital converter (ADC) 1000. The analogue circuit may comprise several portions or components, such as a comparator 1001, a DAC 1002, level shifters 1003 and an OP-AMP 1004. While each portion or component may initially be considered in isolation, the context or environment in which that portion or component operates when applied in the circuit as a whole in situ may affect how that component/block operates, including, for example, the parasitics that the circuit portion, and the circuit as a whole, experiences. The design of analogue circuits has previously proved difficult to automate due to the complex feedback loops and mathematical relationships involved between different portions/components of the analogue circuit.

Embodiments of the claims relate to a method and system for automating the design of analogue circuits so that a more efficient circuit can be designed. In particular, embodiments of the claims relate to a method and system for automating the design of analogue circuits that takes into account both circuit performance requirements (for example, as mandated by a customer) and manufacturing requirements (for example the manufacturing capabilities of the foundry at which the circuit is to be manufactured). As noted above, conventional approaches to analogue circuit design may typically involve "best guess" estimates or specification guard-banding performed manually by engineering teams relying on prior knowledge and experience, often with the result that circuits are over-engineered and inefficient, or prone to failure. In the case where different circuit architectures need to be developed for different manufacturing requirements such as foundry or process design kit (PDK) requirements, if an analogue circuit design has been designed that is suitable for use with a plurality of different foundries/PDKs, this "compatible" circuit design may be selected for all foundries/PDKs even if it is not the most efficient circuit design for other foundries. This results in inefficient circuit design. By contrast, in the present application the inventors have surprisingly developed a counter-intuitive method of circuit design whereby the most appropriate architecture for an analogue circuit design is selected for a particular foundry/PDK rather than just selecting a circuit design that is suitable for use with the foundry/PDK (as well as potentially many other foundries/PDKs). The approach is counter-intuitive because selecting the most appropriate architecture may involve selecting a circuit design that is technically more complex but that is optimised and most efficient in meeting the manufacturing requirements (such as the foundry/PDK requirements) required of it. By contrast, conventional approaches to analogue circuit design would tend to select the technically most simple design that satisfied the manufacturing requirements required of it.

Figure 2:
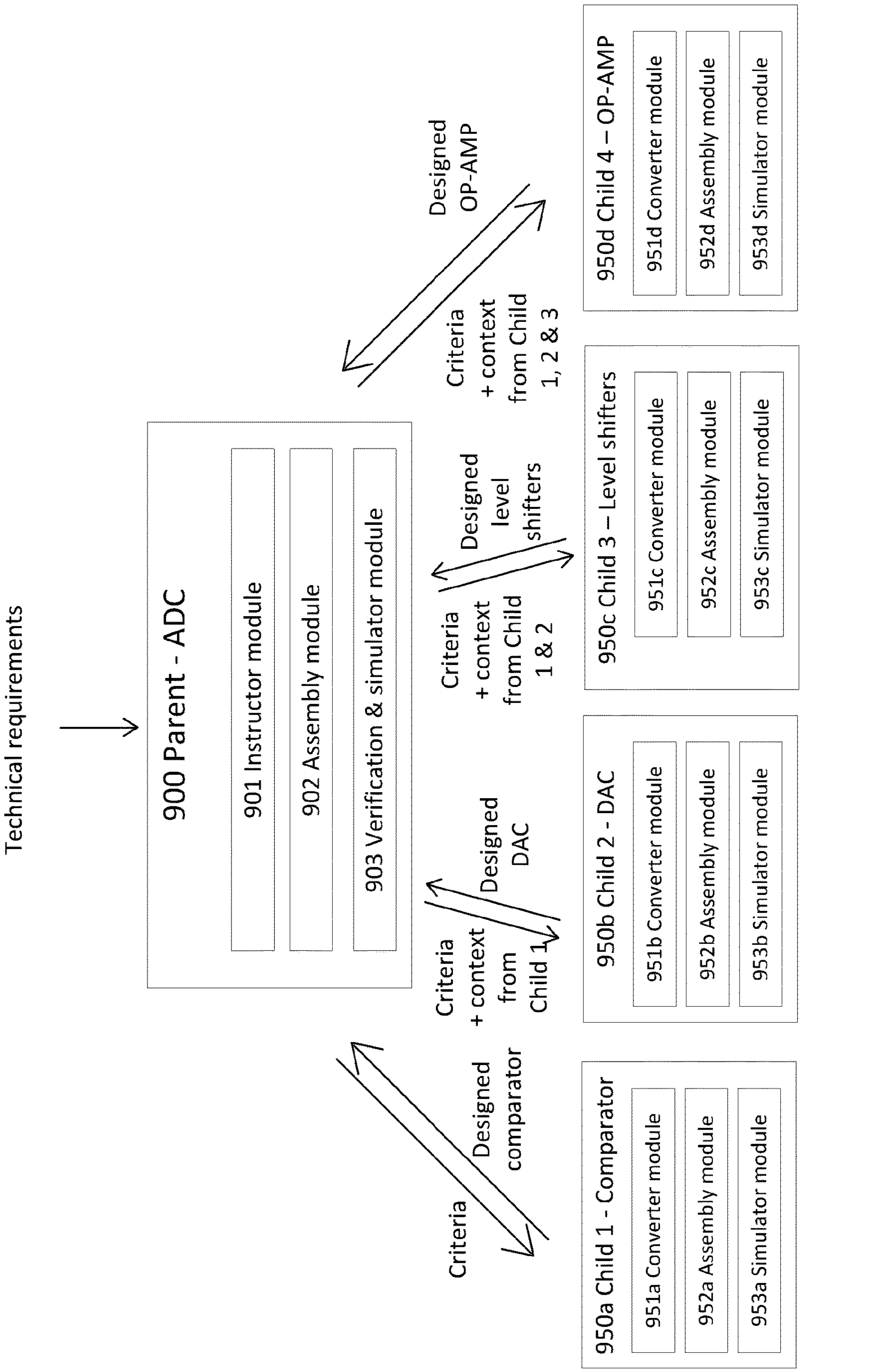
FIG. 2 shows a functional schematic diagram of a computer-implemented hierarchical model for designing analogue circuits.

To implement this solution, the inventors in the present case have developed a computer-implemented model that delegates responsibility for designing portions or components of the analogue circuit to respective units or "blocks". An example of this model is shown in FIG. 2. Such a hierarchical model involves the use of a primary design unit, called a "parent block" 900, that acts as a controlling entity, and a number of secondary design units, called "child blocks" 950*a-d* that receive instructions from the primary design unit or parent block as to what they need to design.

As a controlling entity, the parent block 900 is configured to receive and process the technical requirements and obtain at least one circuit performance requirement and at least one manufacturing requirement for the analogue circuit to satisfy a specific set of manufacturing process related rules. The manufacturing process related rules may, as noted above, be based on foundry or process design kit (PDK) requirements 350. This process performed by the parent block 900 is summarised in FIG. 3, which will be described in more detail below.

The parent block 900 identifies, based on the technical requirements, a plurality of potential analogue circuit design architectures, for satisfying the circuit performance requirements, that will satisfy the at lease on manufacturing requirement. As described below, the parent block 900 may do this by employing a machine learning algorithm. The parent block 900 then selects, as a current analogue circuit design architecture, an initial analogue circuit design architecture from among the plurality of potential analogue circuit design architectures, wherein the selection of the initial analogue circuit design is dependent on the set of manufacturing process related rules The model then produces a current design for the analogue circuit that satisfies the current analogue design architecture. This is done by the parent block 900 instructing each secondary design unit or child block 950*a-d* to design a respective component or portion of the analogue circuit based on instructions received from the parent 900. The instructions may include the circuit performance requirements that the component or portion needs to meet (for example functional requirements).

The parent block 900 may do this by identifying, based on the received information, the plurality of potential analogue circuit design architectures, for satisfying the circuit performance requirement, that will satisfy the manufacturing requirement. The parent block 900 then selects, as the current analogue circuit design architecture, an initial analogue circuit design architecture from among the plurality of potential analogue circuit design architectures, wherein each circuit design architecture comprises a respective plurality of circuit portions, and determines, for each circuit portion of the plurality of circuit portions, respective circuit performance requirements for that circuit portion, wherein the respective circuit performance requirements for each circuit portion are determined based on the specific set of manufacturing process related rules. The parent block 900 then provides instructions that may comprise, for example, the respective circuit performance requirements for each circuit portion, to each of the child blocks 950*a-d*. Each child block 950*a-d* then designs a respective circuit portion of the plurality of circuit portions based on the circuit performance requirements for that respective circuit portion provided by the parent block 900 and outputs a resulting initial design of the respective circuit portion. The parent block 900 receives a respective design for each circuit portion from each of the plurality child blocks 950*a-d* and produces the current analogue circuit design for the analogue circuit that satisfies the current analogue circuit design architecture based on the respective designs for each circuit portion.

In addition to the respective circuit performance requirements for each circuit portion, the instructions provided by the parent block 900 may also include information relating to the context of each component or portion of the circuit—in other words, what that portion or component of the circuit will experience when placed in the completed circuit in situ (in some examples the context may be provided as part of the circuit performance requirements, although in other examples it may be provided as something in addition to the circuit performance requirements). The context may comprise parameters and variables that the portion or component of the circuit experiences in use. The context of any given circuit portion or component may be generated based on simulating the performance of a circuit portion(s) or component(s) that interact with that given circuit portion or component, or even by simulating a completed circuit comprising that given circuit portion or component. For example, the parent block 900 may be configured to assemble a completed circuit from the portions or components designed by each child block 950*a-d* and simulate the assembled circuit's operation. The context of any given circuit portion or component may additionally or alternatively be generated based on mathematical calculations or extraction.

Once a design of an analogue circuit that satisfies the current analogue circuit design architecture has been produced, the design of the completed analogue circuit is tested to determine whether the current design will meet the at least one circuit performance requirement. This testing may be performed by the parent block 900. The parent block 900 may do this by simulating an analogue circuit based on the current analogue circuit design to produce at least one simulation output, and then verifying whether or not the analogue circuit meets the circuit performance requirement.

In the event that the current design for the analogue circuit is determined not to meet the circuit performance requirement, the parent block selects a further analogue circuit design architecture as the current analogue circuit design architecture from the plurality of potential analogue circuit design architectures, wherein the selection of the further analogue circuit design architecture is dependent on the set of manufacturing process related rules. The model then repeats the steps of producing a current design for the analogue circuit that satisfies the current analogue circuit design architecture and testing the design of the completed analogue circuit to determine whether the current design will meet the at least one circuit performance requirement. In the event that the current design does not meet the at least one circuit performance requirement, this process is repeated. However, in the event that the current design does meet the at least one circuit performance requirement, the parent block 900 outputs a design for the analogue circuit.

When testing the design of the analogue circuit design architecture, in some examples the parent block 900 determines, for the current design for the analogue circuit, if it is determined to meet the at least one circuit performance requirement, how well the current design meets the at least one circuit performance requirement and the set of manufacturing process related rules. The parent block 900 may then select, a further analogue circuit design architecture as the current analogue circuit design architecture, wherein the selection of the further analogue circuit design architecture is dependent on the set of manufacturing process related rules, and if it is determined to meet the at least one circuit performance requirement, how well the current design meets the at least one circuit performance requirement and the set of manufacturing process related rules. This process may be repeated to produce a plurality of produced analogue circuit designs that all meet the circuit performance requirement but where some may be better suited to the at least one circuit performance requirement and the set of manufacturing process related rules than others. The parent block 900 may then choose and output a design for the analogue circuit from the plurality of produced analogue circuit designs that best meets the at least one circuit performance requirement and the set of manufacturing process related rules.

When the parent block 900 selects an analogue circuit design architecture, this may be based on a prioritisation of the plurality of potential architectures. For example, there may be a prioritised list of potential analogue circuit design architectures that have been determined to meet or as likely to meet the set of manufacturing process related rules. The list could have been populated by the parent block 900, e.g. based on previous iterations of the design process, or could be supplied to the parent block 900 from elsewhere. For example, as will be described in more detail below, a machine learning algorithm may determine a prioritised list of analogue circuit design architectures based on at least one of (i) the at least one circuit performance requirement, and (ii) the at least one manufacturing requirement for the analogue circuit to satisfy a specific set of manufacturing process related rules The computer-implemented hierarchical model may be iterative. Once the parent block 900 has instructed each child block 950*a-d* to design their respective portions, it may be that a degree of redesign of the circuit and its respective portions is required—for example to take into account features such as the parasitics and/or the context arising from the respective circuit portions designed by the other child blocks 950*a-d*. This may happen before the parent block 900 determines whether the current design will meet the at least one circuit performance requirement. For example, it may be that certain portions of the circuit may need to be adapted—for example due to the context provided by the other designed circuit portions and/or estimated parasitics that may be experienced either by a particular circuit portion or by the completed analogue circuit. The process of designing the circuit portions by each child block 950*a-d* may therefore be repeated to adapt the designs of one or more circuit portions to take into account, for example, the context and/or estimated parasitics in an attempt to mitigate and reduce them. This process of adapting designs of circuit portions may be repeated iteratively by the child blocks 950*a-d*, for example until any change in estimated parasitics caused by any adjustments to any other portions or components of the analogue circuit have been taken into account. For example, the process may iteratively repeat until any changes in estimated parasitics are less than a selected threshold level of change in parasitics.

The context and/or parasitics of any given circuit portion may be generated based on simulating the performance of a circuit portion(s) that interact with that given circuit portion, or even by simulating a completed circuit comprising that given circuit portion. For example, the parent block 900 may be configured to assemble a completed circuit from the portions designed by each child block 950*a-d* and simulate the assembled circuit's operation. The parasitics of any given circuit portion may additionally or alternatively be generated based on mathematical calculations or extraction. Additionally or alternatively, the parasitics of any given circuit portion may be obtained by performing a lookup in a database of circuit designs and parasitics and/or predicted using a machine learning model. The parent block 900 may then verify whether or not the analogue circuit meets the circuit performance requirement. When the analogue circuit meets the circuit performance requirement, the parent block 900 may output the generated design. When the analogue circuit does not meet the circuit performance requirement, the parent block 900 may determine, for at least one affected circuit portion of the plurality of circuit portions, revised circuit performance requirements for that affected circuit portion based on the simulation output and the circuit performance requirement, and provide, to at least one corresponding child block 950*a-d*, the revised circuit performance requirements for each affected circuit portion. The parent block 900 may in return receive a respective updated design of each affected circuit portion from the at least one corresponding child block 950*a-d* and update the current design of the analogue circuit with the respective updated design of each affected circuit portion. The parent block 900 may optionally then determine, for the updated current design for the analogue circuit, whether the current design will meet the at least one circuit performance requirement, and optionally how well the current design meets the at least one circuit performance requirement and/or the set of manufacturing process related rules.

Figure 3:
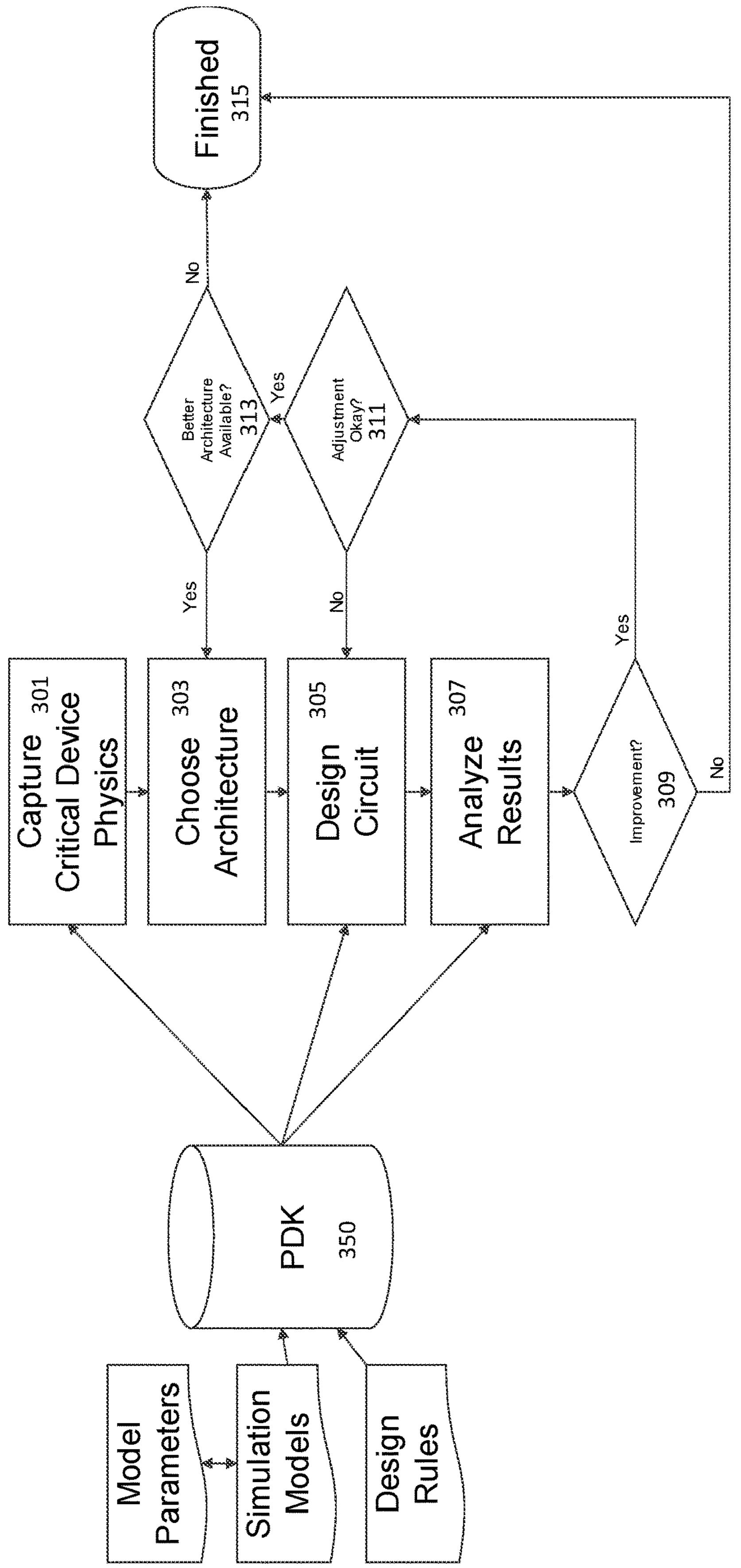
FIG. 3 shows a functional schematic flowchart for a method for designing an analogue circuit for use with the mode of FIG. 2 or FIG. 4.

Such a process is schematically illustrated in FIG. 3. As shown in FIG. 3, information representing technical requirements for the analogue circuit 350 is received. The technical requirements 350 comprise (i) at least one circuit performance requirement, and (ii) at least one manufacturing requirement for the analogue circuit to satisfy a specific set of manufacturing process related rules. In the present case the at least one manufacturing requirements comprise information relating to the PDK. The technical requirements 350 are processes and critical device physics are captured 301. This step may involve identifying, based on the received information, a plurality of potential analogue circuit design architectures, for satisfying the circuit performance requirement, that will satisfy the at least one manufacturing requirement. A current analogue circuit design architecture is then selected 303, from among a plurality of potential analogue circuit design architectures, wherein the selection of the initial analogue circuit design is dependent on the set of manufacturing process related rules. An analogue circuit design is then produced 305 that satisfies the current analogue circuit design architecture. The designed circuit is then analysed 307 to determine for the current design for the analogue circuit, whether the current design will meet the at least one circuit performance requirement. If a previous iteration of the analogue circuit has been designed, the process compares the new (current) design to previous design(s) to determine whether the current analogue circuit design represents an improvement 309. If it is determined at step 309 that the current analogue circuit design does meet the circuit performance requirement, then a previous analogue circuit design that does meet the circuit performance requirement is output. By contrast, if the current analogue circuit design does represent an improvement, then the circuit is checked to determine 311 if there is an improvement to the circuit performance requirements that could be performed. If it is determined that an improvement can be made, then the process re-designs the analogue circuit according to the current design architecture. If it is determined that an improvement cannot be made to the circuit performance requirements, it is then determined 313 whether another architecture may be used to see if that other architecture may represent an improved architecture. If there is another architecture that could be used, the design process is repeated. If there is not another architecture that could be used, the current analogue circuit design is output.

The present inventors have found that advantageously such a process and the use of an iterative hierarchical model allows the design of analogue circuits to be automated. As a result, advantageously this means that over-engineered analogue circuits and/or circuits with unacceptable parasitics can be avoided, and instead more efficient circuits designed and created. Furthermore, the present inventors have recognised that the design and selection of an analogue circuit in this way means that analogue circuits can be designed that are best suited to both the circuit performance requirements but also the manufacturing requirements. This means that circuit architectures that are more efficient can be made that are tailored to e.g. each foundry/PDK's requirements—rather than just using a generic architecture that may be compatible with a foundry/PDKs requirements but that does not represent the best design (e.g. due to inefficiencies, over-engineering etc.).

Figure 1B:
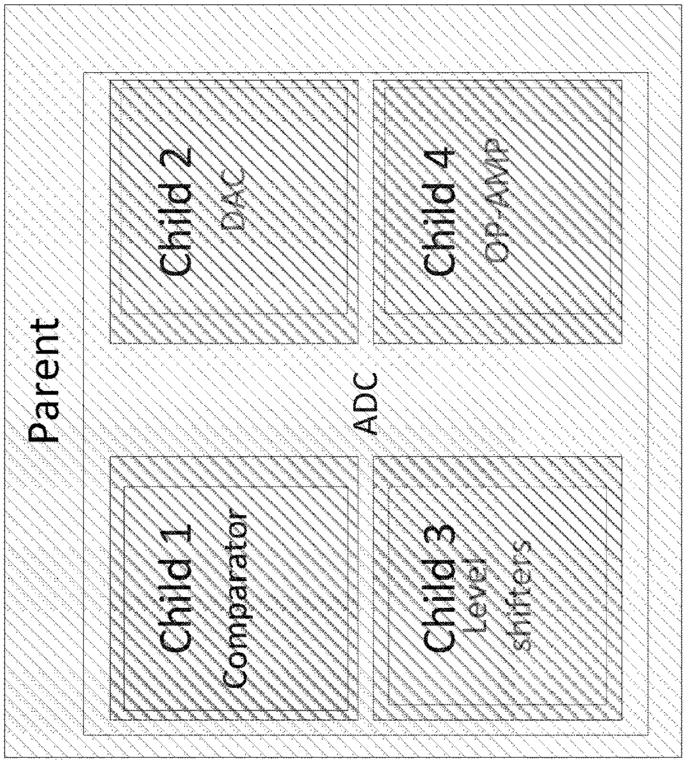
FIG. 1B shows the functional schematic diagram of FIG. 1A divided into conceptual blocks.

As noted above, FIG. 1A shows an example analogue circuit architecture 1000 which in this example is an Analogue-to-Digital Converter (ADC). Conceptually the circuit architecture can be divided up into functional blocks corresponding to different portions or components of the circuit, for example based on their respective functionality. This layout of functional blocks or components can be said to represent the architecture. For example, an ADC may comprise a comparator 1001, a Digital-to-Analogue Converter (DAC) 1002, a plurality of level shifters 1003 and one or more OP-AMPs 1004. In the example shown in FIG. 1A the circuit can be divided up conceptually into blocks corresponding to these different portions or components that make up the architecture. For example, as shown in FIG. 1B the comparator may be divided up conceptually into a first "child block" 950*a*, the DAC into a second child block 950*b*, the level shifters into a third child block 950*c*, and the OP-AMP into a fourth child block 950*d*. The ADC as a whole may be conceptually classified as its own block (labelled "Parent" 900 in FIG. 1B). It will be understood that the ADC may itself form a conceptual block within a larger analogue circuit.

If a circuit were to have a different architecture, it will be understood that the circuit may have different components and a different arrangement and layout of these components—for example, the OP-AMP 1004 in one architecture may be replaced by two smaller OP-AMPs with lower gains in order to meet a specific set of manufacturing process related rules. This may be because the manufacturing process related rules that are dictated by one foundry/PDK means that the gain of the OP-AMP 1004 shown in FIG. 1A may not be supported, and so to achieve the same circuit performance requirement, the gain is achieved by replacing the single OP-AMP 1004 of FIG. 1A with two OP-AMPs each with a smaller gain.

In another example, one PDK may support a voltage of 1.8V, but a second PDK may support a voltage of 0.9V. For the PDK that supports a lower voltage an analogue circuit design architecture may comprise an OTA-based amplifier with a source follower. While this architecture may also work for the higher voltage PDK, such an architecture is not the optimum architecture to use for that PDK—instead a folded cascode is more appropriate and efficient. The folded cascode architecture is more complex and therefore would be counter-intuitive to use if the model and process described herein were not used. That is why it can be said that the present application involves a counter-intuitive approach to analogue circuit design.

As noted above, in use in situ, there is an interplay between each of the different blocks of an analogue circuit. The interactions between these blocks in situ (which may include the parasitics that respective portions experience when placed in the completed circuit), and consequently the parameters and variables that each block experiences when placed in that circuit, affect the performance of that circuit. For example, the specification of the OP-AMP used in the circuit may depend on a number of parameters and variables arising from the selection and design of the comparator, the DAC and/or the level shifters, and the connections between them.

A non-exhaustive list of examples of the parameters and variables that may affect the selection and design of these different blocks may include: silicon process, temperature range, output load, output impedance, input capacitance, input common mode range, input differential swing, supply voltage, types of transistors available, output common mode range, output swing, settling time, noise tolerance; power supply rejection ratio (PSRR); common mode range—input (Input CMR); common mode range—output (Output CMR); linearity; maximum offset; bandwidth; minimum slew rate; intrinsic delay; minimum phase margin; active power consumption; static power consumption; IP3 point; filter centre-frequency; filter band-pass range; load step response; line step response; output accuracy; noise figure; calibration range; noise floor; SNR; ENOB; SINAD; output frequency range; jitter—ptp; jitter—RMS; output ripple ptp; total harmonic distortion; start-up time; channel isolation; reference voltage; gain error; offset error; gain drift. These parameters and variables may be called the “context” or environment in which the block is in. To create an optimal analogue circuit, knowledge of the context can improve the design of the circuit. It will also be understood that some of these parameters and variables may form part of the circuit performance requirements.

As noted above, the manufacturing requirement for the analogue circuit may comprise or dictate a specific set of manufacturing process related rules. The manufacturing requirement could be mandated by the process design kit (PDK) created by the foundry. The PDK could include any or a combination of physical constraints, SPICE models (simulation models), PCELLS and Tech Files, Rule decks and Schematic symbols.

However, it will of course be appreciated that the design of an analogue circuit is an iterative process, whereby the selection and adjustment of one block may affect the context of another block, and so on. Thus once the components of one block have been selected/adjusted to form a circuit portion, the components of another block may need to be adjusted or re-selected to take into account the parasitics and/or context experienced by the completed circuit/circuit portion in which that block is in. Such an iterative process is not practical to perform manually, is error-prone and can only be detected through communication.

As noted above, an example computer-implemented model for use in a method of automating the design of analogue circuits is shown in FIG. 2. FIG. 2 shows schematically the blocks shown in FIG. 1B and discussed above, and the interactions between the blocks.

In the example shown in FIG. 2, each block of the model is responsible for designing the components/functionality indicated by that block. In FIG. 2, child 1 950*a* is responsible for designing the comparator 1001, child 2 950*b* is responsible for designing the DAC 1002, child 3 950*c* is responsible for designing the level shifters 1003, and child 4 950*d* is responsible for designing the OP-AMP 1004. The parent block 900 is responsible for designing as a whole the ADC 1000, and delegates responsibility for designing the portions/components/functionality of the ADC to the child blocks 950*a-d*. In some examples the parent block 900 may select how many child blocks 950*a-d* are required, and the responsibility ascribed to each block. Although the child blocks 950*a-d* are shown in an order, it will be understood that this order is not necessarily representative of the order in which the portions of the circuit are designed. For example, the parent block 900 may instruct the child block 950*d* responsible for the OP-AMP to design that portion of the circuit first. In some examples the child blocks 950*a-d* may be configured to design the output first, and work backwards from there.

While each respective circuit portion may initially be designed by corresponding respective blocks in isolation, the context in which each respective circuit portion operates when applied in the circuit as a whole in situ may affect how both the respective circuit portions, as well as the circuit as a whole, operates. Therefore while the parent block may instruct each child block to design their respective portions, once an initial version of the designed circuit is assembled by the parent 900 from the portions or components designed by each child block 950*a-d*, it is likely that a degree of adaption or even redesign of the circuit 1000 and its portions or components is required to take into account the resulting parasitics and/or the context created by portions designed by the other child blocks 950*a-d*. As noted above, this will be an iterative process.

The parent block 900 is therefore configured to act as a controller, processing and handling the design process carried out by each of the child blocks. To perform this function, as shown in FIG. 2, the parent block 900 may comprise a number of different modules each configured to perform different functions as part of the design process. The parent block in FIG. 2 comprises an instructor module 901, an assembly module 902 and a verification and simulator module 903.

The instructor module 901 is configured to receive technical requirements for the circuit to be designed, including at least one circuit performance requirement and at least one manufacturing requirements for the analogue circuit to satisfy a specific set of manufacturing process related rules, and to convert these into a set of instructions/criteria that each child block 950*a-d* needs to meet when designing their respective components of the circuit. It is also configured to prepare and send the instructions to each child block 950*a-d* as to what they need to design and what criteria they need to meet in doing this.

The instructions may also include the context of other designed portions of circuits designed by other child blocks and the wider context of the circuit in which that component or portion of the circuit is intended to be operated in. For example, the circuit performance requirements may be adjusted to take into account the context.

The assembly module 902 is configured to receive and collate all of the respective designed portions or components of the analogue circuit provided by each of the child blocks 950*a-d*, and to assembly a complete analogue circuit based on the respective designed portions or components. The completed analogue circuit may then be tested by the verification and simulator module 903.

The verification and simulator module 903 is configured to receive the designed components from each of the child blocks and to compare these to the technical set of requirements to determine whether the designed portions or components are satisfactory or not. It may do this by simulating the functioning of the assembled components of the analogue circuit. The verification and simulation module 903 may determine whether the designed components/completed circuit design meets the technical requirements, for example by verifying whether or not a designed respective circuit portion or component meets its corresponding circuit performance requirements and/or whether or not the designed analogue circuit meets the specific set of manufacturing process related rules. In so doing, it may also determine how well it meets these requirements, for example by allocating a score based on how closely the requirements are met and/or if they are exceeded. It may additionally or alternatively comprise a validation check to determine whether or not the circuit that is designed is valid in the sense that it can operate within certain technical limitations.

The verification and simulator module 903 may be configured to act as a "test bed" and simulate the functioning of the assembled components of the circuit. Such a simulation may yield, for example, the parasitics information and/or context information, as well as information relating to how well the components/completed circuit design meets the technical requirements such as the circuit performance requirements and/or the specific set of manufacturing process related rules. For example, the verification and simulator module 903 may be configured to obtain performance information, for example relating to the context and parasitics that will be experienced in the analogue circuit if the analogue circuit were to include that designed circuit portion, by mathematically simulating the performance of at least one of (i) the designed circuit portion and (ii) a complete analogue circuit comprising the designed circuit portion, in a virtual test bench. Additionally or alternatively, the verification and simulator module 903 may be configured to obtain performance information, for example relating to parasitics, that will be experienced in the analogue circuit if the analogue circuit were to include that designed circuit portion, by performing a lookup in a database of circuit designs and parasitics, for example by performing a lookup, in a database of circuit designs and parasitics, for similar generated designs. Additionally or alternatively the verification and simulator module 903 may be configured to perform a lookup, in a database of circuit designs and parasitics, for at least one of the respective circuit portions for similar respective circuit portions, and obtain performance information, for example relating to parasitics experienced by the generated design based on the values of parasitics obtained via the lookup for the at least one of the respective circuit portions. In other examples the verification and simulator module 903 is configured to obtain performance information, for example relating to parasitics experienced by that generated design, by using a machine learning model to predict the performance of the circuit.

The verification and simulator module 903 may also be configured to populate a database of circuit designs, for example if the instructor module 901 instructs the child blocks 950*a-d* to repeat the process of designing circuit portions based on (new or adapted) corresponding circuit performance requirements a plurality of times. The database of circuit designs may also comprise information relating to how well a circuit design meets the technical requirements.

Each child block 950*a-d* also comprises a number of different modules each configured to perform different functions as part of the design process. In the example shown in FIG. 2 each child block 950*a-d* comprises a converter module 951*a-d*, an assembly module 952*a-d* and a simulator module 953*a-d*. It will be understood that in some examples each child block 950*a-d* may further comprise additional modules for instructing tertiary design units or "grandchild" blocks, similar to the way in which the parent block 900 in FIG. 2 comprises modules such as the instructor module and verification module for instructing and verifying the design process from the child blocks 950*a-d*, as will be described in more detail below with reference to FIGS. 4 to 6.

The converter module 951*a-d* of each child block 950*a-d* is configured to receive the circuit performance requirements received from the parent block 900 and optionally the context of the circuit as a whole, as well as the context of the other components of the circuit, and convert these into a set of requirements for designing a portion or component of the analogue circuit to meet those criteria. It will be understood that in some examples the context information may be provided and received as part of the circuit performance requirements, but in other examples it may be provided in addition to (e.g. separate from) the circuit performance requirements.

The assembly module 952*a-d* is configured to select and/or design electronic components to satisfy the requirements being asked of it that meet the instructions/criteria dictated by the parent block and the context of the circuit as a whole and/or the context of the other components of the circuit.

The simulator module 953*a-d* may also be configured to simulate how those components would run in situ to check/verify whether the designed portions or components designed by the assembly module are technically feasible. In some examples the simulator module 953*a-d* may also obtain information relating to the parasitics of the respective circuit portion that its block has designed, in a manner similar to the verification and simulator module 903 of the parent block 900 described above (it will be understood that in such examples the verification and simulator module 903 of the parent block 900 may not need to obtain information relating to parasitics as this may have already been performed by the simulator module 953*a-d* of each child block 950*a-d*).

In use, the parent block 900 receives a set of technical requirements for an analogue circuit 1000 to be designed. The technical requirements include at least one circuit performance requirement and at least one manufacturing requirements for the analogue circuit to satisfy a specific set of manufacturing process related rules. In the example shown in FIG. 2, the parent block 900 receives a set of technical requirements for an ADC to be designed that has certain properties including, for example properties dictated by the foundry (i.e. manufacturing requirements) that will be manufacturing the ADC.

The parent block 900 receives these requirements and the instructor module 901 converts these into a set of instructions/criteria. As part of this process, the instructor module 901 selects, as a current analogue circuit design architecture, an initial analogue circuit design architecture from among the plurality of potential analogue circuit design architectures, wherein the selection of the initial analogue circuit design is dependent on the set of manufacturing process related rules.

These instructions/criteria are then sent to each of the child blocks 950*a-d*. The instructor module 901 may send these instructions/criteria to each of the child blocks 950*a-d* in parallel (i.e. all at the same time) or in series (e.g. where the criteria are sent to child 1, then child 2, then child 3 and so on). In some examples the instructor module 901 may wait until it receives a designed circuit from the first child before sending a set of circuit performance requirements to the next child, and in some examples the instructor module may be configured to adjust the circuit performance requirements sent to the next child based on the designed circuit received from the preceding child—in other words based on the context of the designed circuit received from the preceding child.

In examples where instructions/criteria are sent to the child blocks 950*a-d* in series, the instructions/criteria may comprise means to distinguish which portions of the circuit performance requirements are relevant to which child blocks 950*a-d*—for example, the instructions/criteria may comprise headers or flags that identify whether or not a particular portion of the instructions/criteria is relevant to a child block 950*a-d* or not. These headers or flags may be determined by the parent block 900, and the instructions/criteria adjusted accordingly to incorporate them.

Each child block 950*a-d* receives these instructions/criteria from the parent block 900 and each respective converter module 951*a-d* converts these into a set of requirements for designing a portion or component of the analogue circuit to meet those circuit performance requirements. The assembly module 952*a-d* receives these requirements and designs components/a portion of the circuit that meets these requirements. It will be understood that this design process may comprise a lookup in a database of known circuit designs (or portions therefore) and finding a circuit design that best matches the instructions/criteria.

The simulator module 953*a-d* then simulates how these components/portion of the circuit would work in situ to check whether the designed components/portion of the circuit designed by the assembly module is technically feasible and/or to verify whether or not the corresponding designed respective circuit portion meets the instructions/criteria. If the designed circuit portion meets its corresponding instructions/criteria, the child block 950*a-d* is then configured to send or output the designed portion or component of the circuit back to the parent 900. If the designed circuit portion does not meet its corresponding instructions/criteria, the child block 950*a-d* is then configured to adapt the design of its circuit portion and repeat the process.

Once the parent 900 receives all of the designed portions or components of the circuit back from all the child blocks 950*a-d*, the assembly module 902 of the parent 900 then assembles the completed circuit (in this case the ADC) from the portions or components designed by each child block and verifies whether the designed circuit meets the technical requirements via the verification and simulator module 903. It may do this by simulating how the assembled circuit performs and comparing this simulated performance to the circuit performance requirements and/or the manufacturing requirements. For example, the verification and simulation module 903 may determine whether the designed components/completed circuit design meets the technical requirements, for example by verifying whether or not a designed respective circuit portion or component meets its corresponding circuit performance requirements and/or whether or not the designed analogue circuit meets the specific set of manufacturing process related rules. In so doing, it may also determine how well it meets these requirements, for example by allocating a score based on how closely the requirements are met and/or if they are exceeded. It may additionally or alternatively comprise a validation check to determine whether or not the circuit that is designed is valid in the sense that it can operate within certain technical limitations. It will be understood that in some examples this simulated performance of the completed analogue circuit design may be used to obtain the parasitics and/or the optional context information (e.g. for another design unit), and the parent 900 may adjust the circuit performance requirements based on the parasitics and/or optional context information obtained via the simulation of the completed analogue circuit design.

If the simulated performance of the designed circuit does not meet the at least one circuit performance requirement (for example, a parameter of the simulated circuit is greater than a threshold level of different from a parameter dictated by the circuit performance requirements such as the parasitics being above a threshold level of parasitics) then the verification module 903 communicates this to the instructor module 901. The instructor module 901 may then select a further analogue circuit design architecture as the current analogue circuit design architecture, wherein the selection of the further analogue circuit design architecture is dependent on the set of manufacturing process related rules In some examples the parent block 900 (for example, the verification module 903/instructor module 901), before a further analogue circuit design architecture is selected, may be configured to determine which portion or component of the circuit is responsible for the circuit not meeting the circuit performance requirements (for example which portion is responsible fora large proportion of the parasitics), and in the event that a child block(s) 950*a-d* can be identified, the parent block 900 may be configured to send the revised circuit performance requirements only to the child block responsible for the offending portions or components of the circuit. However, in other examples the revised criteria may be sent back to all child blocks 950*a-d*. It will also be appreciated that in some examples the parent module 900 may determine that additional and/or alternative child blocks 950*a-d* and/or grandchild blocks may be required to design the relevant portions or components of the circuit, for example to meet the revised circuit performance requirements.

The process then continues in an iterative manner, where the converter module 951*a-d* of each child block 950*a-d* receives these revised or adapted circuit performance requirements from the parent block 900 and converts these into a new set of instructions/criteria for designing a portion or component of the analogue circuit to meet those adapted circuit performance requirements. The assembly module

952*a-d* receives these new instructions/criteria and designs components/a portion of the circuit that meets these requirements. The simulator module 953*a-d* may then simulate how the redesigned components/portion of the circuit would work in situ to check whether the designed components/portion of the circuit designed by the assembly module is technically feasible. The child block 950*a-d* is then configured to send the (re)designed components/portion of the circuit back to the parent 900.

Once the parent 900 receives all of the (re)designed components/portions of the circuit back from all the child blocks 950*a-d*, the parent 900 then assembles the completed circuit (in this case the ADC) from the components/portions designed by each child block and verifies whether the designed circuit meets the circuit performance requirements via the verification and simulator module 903 which may simulate how the assembled circuit performs and compares this simulated performance to the circuit performance requirements. When the analogue circuit meets the circuit performance requirement, the parent block 900 may output the generated design. When the analogue circuit does not meet the circuit performance requirement, the parent block 900 may determine, for at least one affected circuit portion of the plurality of circuit portions, revised instructions/criteria for that affected circuit portion based on the simulation output and the circuit performance requirement, and provide, to at least one corresponding child block 950*a-d*, the revised instructions/criteria for each affected circuit portion. The parent block 900 may in return receive a respective updated design of each affected circuit portion from the at least one corresponding child block 950*a-d* and update the current design of the analogue circuit with the respective updated design of each affected circuit portion.

As shown in FIG. 3 as described above, the parent block 900 may optionally then determine 307, for the updated current design for the analogue circuit, whether the current design will meet the at least one circuit performance requirement, and optionally how well the current design meets the at least one circuit performance requirement and/or the set of manufacturing process related rules. This process may be repeated to produce a plurality of produced analogue circuit designs that all meet the circuit performance requirement but where some may be better suited to the at least one circuit performance requirement and the set of manufacturing process related rules than others. The parent block 900 may then choose and output a design for the analogue circuit from the plurality of produced analogue circuit designs that best meets the at least one circuit performance requirement and the set of manufacturing process related rules.

It will be understood that the child blocks 950*a-d* and/or the parent block 900 may also comprise a loop mitigation module to stop endless redesign loops occurring. For example, the loop mitigation module may be configured to have a record of previously designed circuits and output a loop indication if a redesigned component/portion of a circuit, or completed circuit, is identical to a previously designed component/portion of a circuit, or completed circuit, or only differs from a previously designed component/portion of a circuit, or completed circuit by less than a selected threshold level of difference. For example, the parent block 900 may comprise the loop mitigation module and may be configured to end the design process and accept the last designed circuit as the completed circuit in the event that the loop mitigation module provides the loop indication. Additionally, or alternatively, the parent block 900 may be configured to reduce the selected threshold level of difference, for example if the design process repeats for a selected number of iterations. This may have the effect of finding the "best compromise" functioning circuit that meets the technical requirements.

Figure 4:
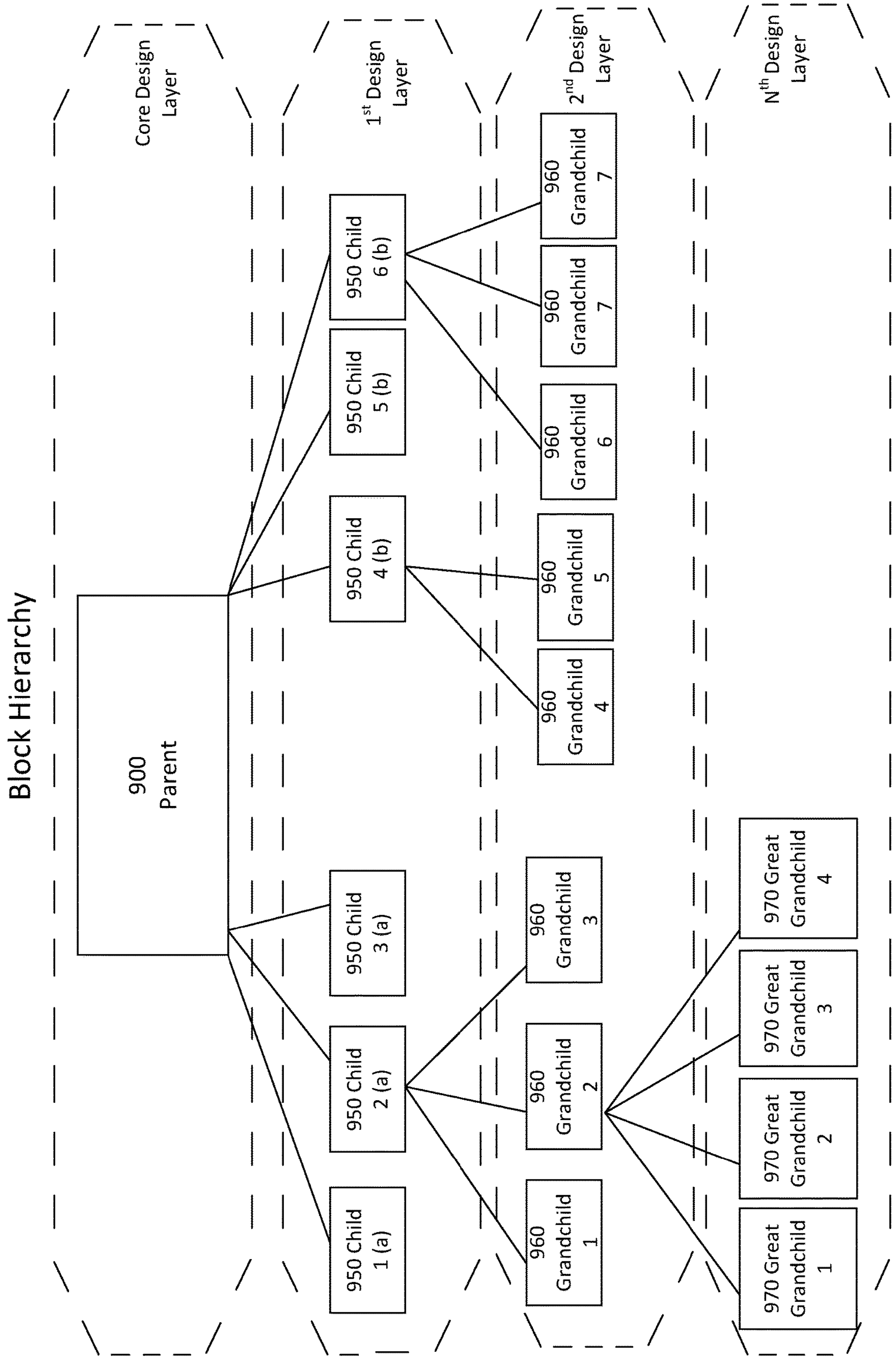
FIG. 4 shows a functional schematic view of another example implementation of a computer-implemented model for designing analogue circuit.

FIG. 4 illustrates a functional schematic view of another example implementation of a computer-implemented model for designing analogue circuits. The implementation of the model is in many respects similar to the model shown in FIG. 2 and the functionality described above for the parent 900 and child blocks 950*a-d* with respect to FIG. 2 may be ascribed to the parent and child blocks in FIG. 4. In addition, some of the functionality described in FIG. 2 with respect to a primary design unit or parent block 900 may be ascribed to a secondary design unit or child block 950*a-d* in FIG. 4 where that child block has tertiary design units or "grandchild" blocks beneath it, and so on.

In more detail, as shown in FIG. 4, the model hierarchy comprises a core design layer comprising a primary design unit or parent block. Although only one parent block 900 is shown in the core design layer in FIG. 4, it will be understood that in some examples there may be more than one parent block 900, for example where each parent block 900 operates in parallel. For example, each parent block 900 may be configured to design different aspects (e.g. functionally and/or structurally different from each other) of an analogue circuit.

Beneath the core design layer sits a first design layer. The first design layer comprises secondary design units or child blocks 950 coupled to the parent block 900 of the layer above (in this case the core design layer). In the example shown there are six child blocks, all coupled to the parent block of the core design layer. The child blocks 950 are grouped into two different groups: a first group comprising child blocks 1, 2 and 3; and a second group comprising child blocks 3, 4 and 5. Each child block 950 is coupled to the parent block 900. The two groups may represent different functional regions or areas of an analogue circuit which the parent block 900 instructs to be designed in parallel.

In the example shown, the child blocks 950 of the first group are coupled in parallel to the parent block 900 of the core design layer, and the child blocks 950 of the second group are coupled in parallel to the parent block 900 of the core design layer. The child blocks 950 may be grouped in this way to design different areas or aspects (e.g. functionally and/or structurally different from each other) of an analogue circuit. However, it will be understood that in some examples not all child blocks 950 of the first design layer need to be coupled in parallel to the parent block of the core design layer. For example, child blocks 1 and 3 of the first design layer may be coupled to the parent block 900 of the core design layer, and child block 2 of the first design layer may be coupled in series to child blocks 1 and 3 of the first design layer respectively.

The grouping of the child blocks 950 may be determined by the parent block 900 of the core design layer. For example, the parent block 900 may be configured to group the child blocks of the first design layer so as to design different aspects (e.g. functionally and/or structurally different from each other) of an analogue circuit. The parent block 900 of the core design layer may be configured to do this based on a determination of requirements from a customer specification.

Beneath the first design layer sits a second design layer. The second design layer comprises tertiary design units or grandchild blocks 1, 2, 3, 4, 5, 6, 7 and 8 960. The grandchild blocks 960 are coupled to child blocks of the layer above (the first design layer). Not every child block of the first design layer is coupled to a grandchild block of the second design layer. In the example shown, grandchild blocks 1, 2 and 3 of the second design layer are coupled in parallel to child block 2 of the first design layer. However, as described above for the child blocks 950 of the first design layer, it will be understood that in some examples not all grandchild blocks of the second design layer need to be coupled in parallel to the child block of the first design layer. For example, grandchild blocks 1 and 3 of the second design layer may be coupled to the child block 2 of the first design layer, and grandchild block 2 of the second design layer may be coupled in series to grandchild blocks 1 and 3 of the second design layer respectively.

Beneath the second design layer sits another (nth) design layer. The nth design layer comprises greatgrandchild blocks 1, 2, 3 and 4 970. The greatgrandchild blocks 970 are coupled to grandchild blocks 960 of the layer above (the second design layer) in much the same way that the grandchild blocks 960 of the second design layer are coupled to the child blocks 950 of the first design layer. It will therefore be understood that there may a plurality of further design layers sitting below the second design layer each comprising their own blocks coupled to blocks of the layer above.

The structure of the block hierarchy shown in FIG. 4 is such that the blocks of different layers of the model are configured to design aspects or portions of an analogue circuit at different levels of complexity. For example, the parent block 900 may be configured to design a complete analogue circuit, the child blocks 950 configured to design functional components of the analogue circuit (such as an op-amp, AC/DC converter, level shifters, comparators, voltage regulators, power switches etc.), and grandchild block 960 configured to design the components of that functional component (e.g. the arrangement of resistors, transistors, capacitors, diodes, inductors etc. for that component).

The parent block 900 (of the core design layer) may be configured to determine the level of complexity a block of a selected layer is configured to design, and/or the blocks of one layer may be configured to determine the level of complexity that the blocks of the layer below are configured to design.

Additionally, or alternatively, the structure of the block hierarchy shown in FIG. 4 is such that the blocks of different layers of the model are configured to design aspects or portions of an analogue circuit based on different functional or structural requirements. For example, one layer may comprise blocks configured to design aspects or portions of an analogue circuit based on one functional requirement (e.g. size) and another layer may comprise blocks configured to design another functional requirement (e.g. current or voltage).

Figure 5:
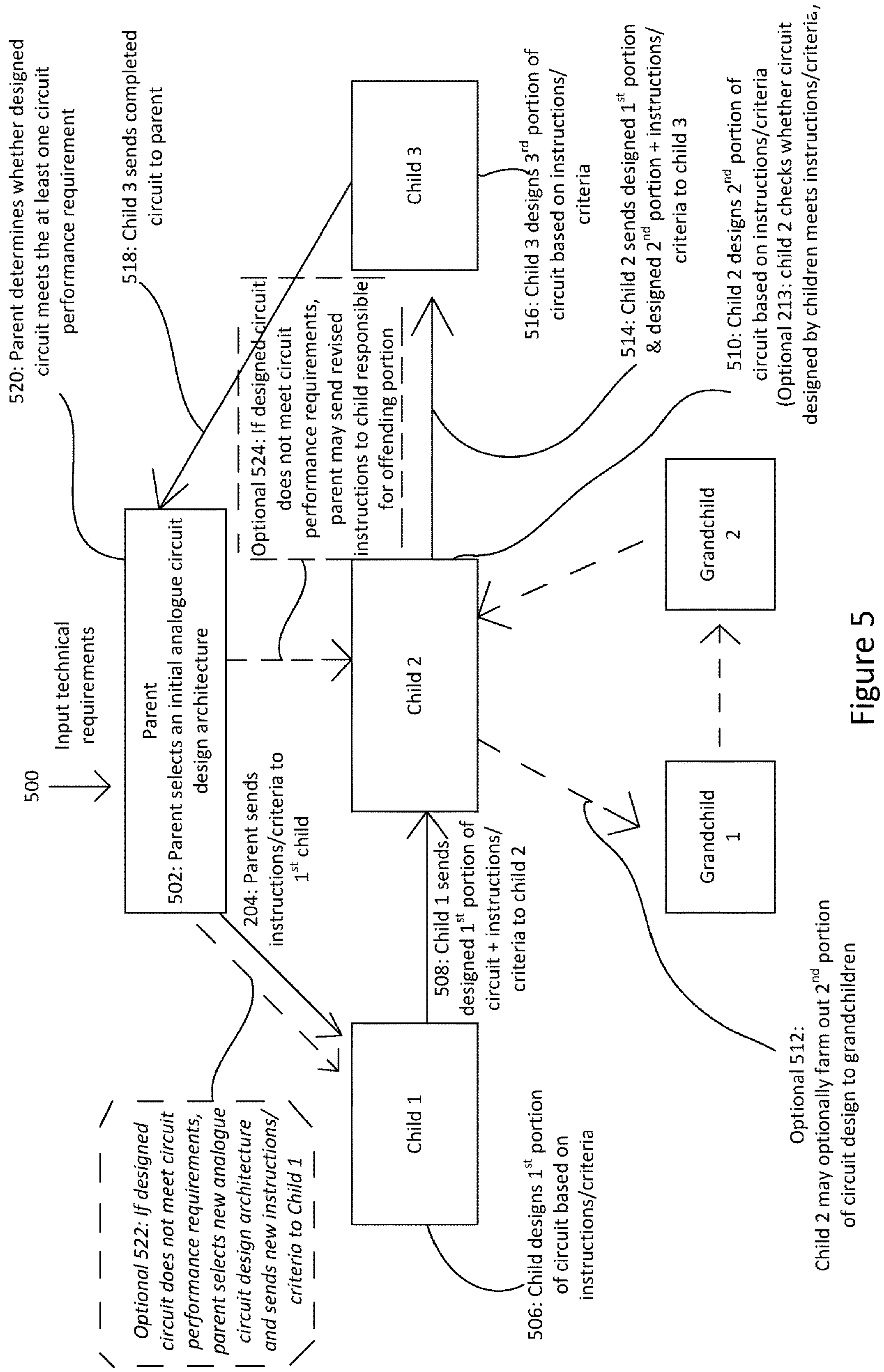
FIG. 5 shows a functional schematic flow chart for a method of designing an analogue circuit, for example using the example computer-implemented model of FIG. 2 or FIG. 4.

FIG. 5 shows a functional schematic flow chart for an example method of designing an analogue circuit, for example using the example computer-implemented hierarchical model of FIG. 2 or FIG. 4. The method of FIG. 5 shares many features in common with the method described above with respect to FIG. 2.

At step 500 the parent block 900 receives the technical requirements for the circuit to be designed, including at least one circuit performance requirement and at least one manufacturing requirements for the analogue circuit to satisfy a specific set of manufacturing process related rules. The parent block 900 is configured to convert the technical requirements into a set of instructions/criteria. As part of this process, the instructor module 901 selects 502, as a current analogue circuit design architecture, an initial analogue circuit design architecture from among the plurality of potential analogue circuit design architectures, wherein the selection of the initial analogue circuit design is dependent on the set of manufacturing process related rules.

The parent block 900 may additionally or alternatively be configured to determine whether to send these instructions/criteria to child blocks 950 in parallel, or in series, and/or whether to send different sets of instructions/criteria to child blocks 950 of a layer below.

At this stage the parent block 900 may also be configured to determine the number of layers of the model—for example based on the selected current analogue circuit design architecture, or alternatively the block of each layer may be configured to determine if blocks of an underlying layer are required when designing portions of the circuit they are tasked with designing by a block in a layer above.

Once the parent block 900 has converted 502 the technical requirements into instructions/criteria, it then sends 504 these to child 1 of the first design layer. These instructions/criteria may specify how many child blocks 950 of this layer are to be used, and which child block 950 is to be tasked with designing each portion of the analogue circuit.

Upon receiving the criteria, the child 1 designs 506 a first portion of the analogue circuit based on the received instructions/criteria according to the current analogue circuit design architecture. It will be understood that child 1 may be configured to design a first portion of the analogue circuit based on a subset/a first portion of the instructions/criteria applicable to it, as determined by the parent block.

Once child 1 has designed the first portion of the analogue circuit, the instructions/criteria received from the parent block 900 may dictate that child 1 is to send 508 the designed first portion of the circuit and the criteria on to a second child (child 2) of the same layer. Child 2 may design 510 a second portion of the analogue circuit based on the received instructions/criteria according to the current analogue circuit design architecture, and in some examples may design the second portion of the analogue circuit based on only a subset of the instructions/criteria (e.g. only those portions applicable to it) or based on all of the instructions/criteria.

Child 2 also adapts the design of the second portion of the analogue circuit based on the context created by the designed first portion of the analogue circuit designed by child 1. In some examples this context may be expressed in the form of an adjusted set of criteria—for example, child 1 and/or the parent block may be configured to adjust the criteria based on the context and/or parasitics provided by the designed first portion of the circuit designed by child 1, although it will be understood that in other examples the context and/or parasitics may be provided in addition to/separately to the criteria. For example, in examples where the parent block comprises a verification and simulator module, the verification and simulation module may simulate the performance of the designed portion or component of the circuit to obtain the context and/or parasitics information. Additionally, or alternatively, in examples where each child block comprises a verification and simulator module, the verification and simulation module may simulate the performance of the designed portion or component of the circuit to obtain the context and/or parasitics information.

In some examples, child 2 may determine that it needs to employ blocks of a lower layer to design portions of the circuit that it is tasked with designing according to the current analogue circuit design architecture, and/or determine whether to employ these blocks of a lower layer in series and/or in parallel. Additionally or alternatively, the criteria received by the child 2 may dictate (for example, as determined by the parent block) that child 2 is to employ blocks of a lower layer to design portions of the circuit that child 2 is tasked with designing (and whether to employ these blocks in series or in parallel). For example, as shown in FIG. 6, child 2 may optionally instruct 512 grandchild 1 and grandchild 2 to design a subset of the second portion of the analogue circuit. In such examples, child 2 may optionally verify whether the portion of the circuit designed by blocks of the layer below (in the example shown, grandchild 1 and grandchild 2) meet the instructions/criteria required of them.

Child 2 then sends 514 the designed first portion, the designed second portion and the instructions/criteria to child 3. In some examples, the instructions/criteria may be modified by a preceding child. For example, the instructions/criteria may be modified by child 1 and/or child 2 before being sent to the next child. For example, child 2 may be configured to modify the instructions/criteria it sends to child 3 based on the designed first portion of the circuit and/or the designed second portion of the circuit.

Child 3 then designs 516 a third portion of the analogue circuit according to the current analogue circuit design architecture based on the received instructions/criteria and additionally or alternatively the designed first portion and/or the designed second portion of the circuit.

Child 3 then sends 518 the completed circuit to the parent block, and the parent block generates an initial design for the analogue circuit based on the set of respective circuit portion designs and determines 520 whether the current designed completed circuit meets the circuit performance requirements. As noted above, the parent block may do this by employing a verification and simulation module to simulate the performance of the completed circuit.

If the designed completed circuit does not meet the circuit performance requirements, the parent block selects a further analogue circuit design architecture, wherein the selection of the further analogue circuit design architecture is dependent on the set of manufacturing process related rules. The process then repeats whereby the parent may resend 522 instructions/criteria to child 1 to redesign a new analogue circuit according to the new analogue circuit design architecture. As part of this process the parent may determine that additional or alternative child (and/or grandchild) blocks need to be employed. If the designed circuit does not meet circuit performance requirements, the parent may optionally be configured to send revised instructions 524 to the child responsible for an offending portion of the circuit.

It will be understood in the above example that the first, second, third and fourth portions of the analogue circuit may be independent portions of the circuit and/or be functionally dependent on each other. In other examples the first, second, third and fourth portions of the analogue circuit may be selected subsets of the analogue circuit. For example, the second portion may comprise portions of the first portion, the third portion comprises portions of the first and second portions, and the fourth portion comprise portions of the first, second and third portions.

Figure 6A:
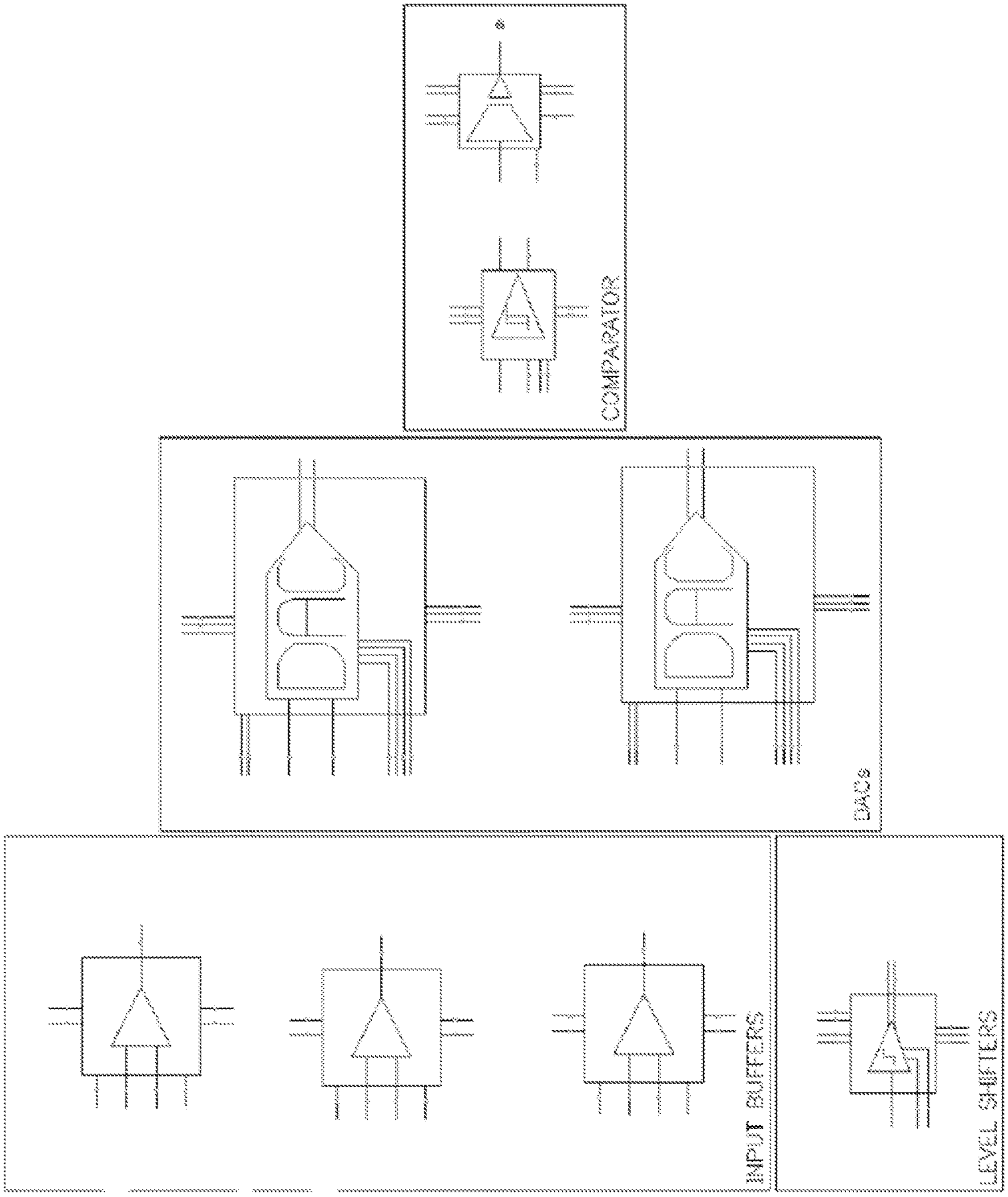
FIG. 6A shows portions of an analogue circuit designed by a computer-implemented hierarchical model, such as the model described with reference to any of FIGS. 1A to 2 and 4 to 5.

FIG. 6A shows Input Buffers, Level Shifters, DACs and a Comparator. Each of these may form a portion of a completed analogue circuit, such as the completed ADC shown in FIG. 6B.

Figure 6B:
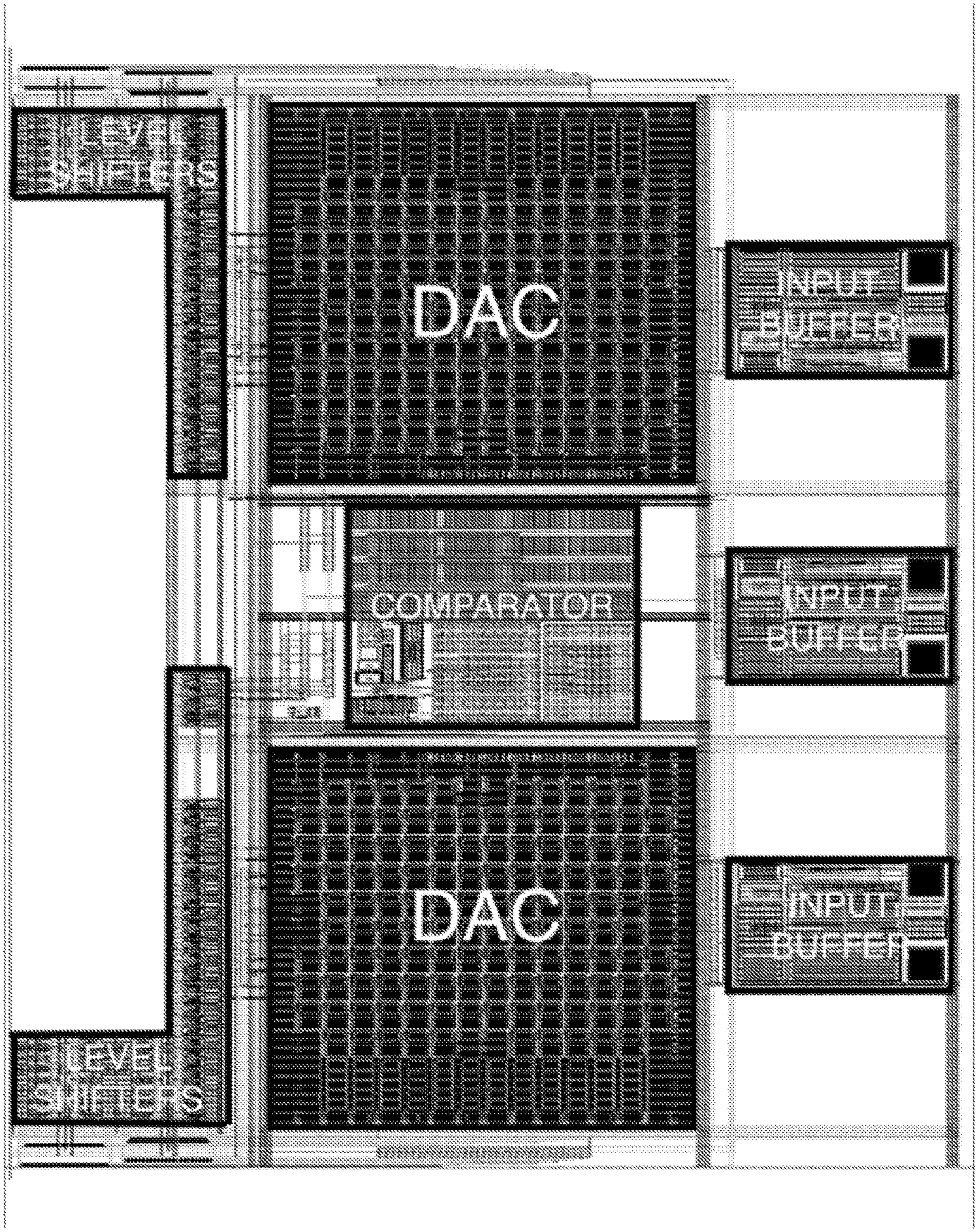
FIG. 6B shows an example of a designed analogue circuit comprising the circuit portions of FIG. 6A.

The examples shown in FIGS. 6A and 6B have been designed using a computer-implemented hierarchical model as described above. A parent block (or primary design unit) is responsible for designing the overall ADC, with child blocks (or secondary design units) being responsible, respectively, for each of the Input Buffers, Level Shifters, DACs and the Comparator. The parent block receives technical requirements from a user and converts these into circuit performance requirements which are used by each child block to design their respective portions of the circuit. The context of other portions of the circuit is considered and used by the child blocks in designing their respective portions of the circuit. The model is also iterative in that once the parent block 900 has instructed each child block 950*a-d* to design their respective portions or components, a degree of redesign of the circuit and its portions is performed so that the context provided by the other portions of the circuit is used in designing the respective circuit portions and the circuit as a whole. As described above, each child block and/or parent block may also perform validation/verification to determine whether the designed portions/complete circuit meets the technical requirements asked of it.

In the designed circuit shown in FIG. 6B, the reason there are two DACs is that the circuit provides a differential ADC works. The reason there are multiple (in the example shown, three) input buffers is that two are used to buffer two inputs and the reference is also buffered as an input.

As noted above, the analogue circuit design apparatus may make use of a machine learning model to identify, select and/or prioritise potential analogue circuit design architectures.

The machine learning model may comprise a neural network. The neural network may comprise at least one of a deep residual network, a highway network, a densely connected network and a capsule network.

For any such type of network, the network may comprise a plurality of different neurons, which are organised into different layers. Each neuron is configured to receive input data, process this input data and provide output data. Each neuron may be configured to perform a specific operation on its input, e.g. this may involve mathematically processing the input data. The input data for each neuron may comprise an output from a plurality of other preceding neurons. As part of a neuron's operation on input data, each stream of input data (e.g. one stream of input data for each preceding neuron which provides its output to the neuron) is assigned a weighting. That way, processing of input data by a neuron comprises applying weightings to the different streams of input data so that different items of input data will contribute more or less to the overall output of a neuron. Adjustments to the value of the inputs fora neuron, e.g. as a consequence of the input weightings changing, may result in a change to the value of the output for that neuron. The output data from each neuron may be sent to a plurality of subsequent neurons.

The neurons are organised in layers. Each layer comprises a plurality of neurons which operate on data provided to them from the output of neurons in preceding layers. Within each layer there may be a large number of different neurons, each of which applies a different weighting to its input data and performs a different operation on its input data. The input data for all of the neurons in a layer may be the same, and the output from the neurons will be passed to neurons in subsequent layers.

The exact routing between neurons in different layers forms a major difference between capsule networks and deep residual networks (including variants such as highway networks and densely connected networks).

For a residual network, layers may be organised into blocks, such that the network comprises a plurality of blocks, each of which comprises at least one layer. For a residual network, output data from one layer of neurons may follow more than one different path. For conventional neural networks (e.g. convolutional neural networks), output data from one layer is passed into the next layer, and this continues until the end of the network so that each layer receives input from the layer immediately preceding it and provides output to the layer immediately after it. However, for a residual network, a different routing between layers may occur. For example, the output from one layer may be passed on to multiple different subsequent layers, and the input for one layer may be received from multiple different preceding layers.

In a residual network, layers of neurons may be organised into different blocks, wherein each block comprises at least one layer of neurons. Blocks may be arranged with layers stacked together so that the output of a preceding layer (or layers) feeds into the input of the next block of layers. The structure of the residual network may be such that the output from one block (or layer) is passed into both the block (or layer) immediately after it and at least one other later subsequent block (or layer). Shortcuts may be introduced into the neural network which pass data from one layer (or block) to another whilst bypassing other layers (or blocks) in between the two. This may enable more efficient training of the network, e.g. when dealing with very deep networks, as it may enable problems associated with degradation to be addressed when training the network (which is discussed in more detail below). The arrangement of a residual neural network may enable branches to occur such that the same input provided to one layer, or block of layers, is provided to at least one other layer, or block of layers (e.g. so that the other layer may operate on both the input data and the output data from the one layer, or block of layers). This arrangement may enable a deeper penetration into the network when using back propagation algorithms to train the network. For example, this is because during learning, layers, or blocks of layers, may be able to take as an input, the input of a previous layer/block and the output of the previous layer/block, and shortcuts may be used to provide deeper penetration when updating weightings for the network.

For a capsule network, layers may be nested inside of other layers to provide 'capsules'. Different capsules may be adapted so that they are more proficient at performing different tasks than other capsules. A capsule network may provide dynamic routing between capsules so that for a given task, the task is allocated to the most competent capsule for processing that task. For example, a capsule network may avoid routing the output from every neuron in a layer to every neuron in the next layer. A lower level capsule is configured to send its input to a higher level (subsequent) capsule which is determined to be the most likely capsule to deal with that input. Capsules may predict the activity of higher layer capsules. For example, a capsule may output a vector, for which the orientation represents properties of an object in question. In response, each subsequent capsule may provide, as an output, a probability that the object that capsule is trained to identify is present in the input data. This information (e.g. the probabilities) can be fed back to the capsule, which can then dynamically determine routing weights, and forward the input data to the subsequent capsule most likely to be the relevant capsule for processing that data.

For either type of neural network, there may be included a plurality of different layers which have different functions. The neural network may include at least one convolutional layer configured to convolve input data across its height and width. The neural network may also have a plurality of filtering layers, each of which comprises a plurality of neurons configured to focus on and apply filters to different portions of the input data. Other layers may be included for processing the input data such as pooling layers (to introduce non-linearity) such as maximum pooling and global average pooling, Rectified Linear Units layer (ReLU) and loss layers, e.g. some of which may include regularization functions. The final block of layers may receive input from the last output layer (or more layers if there are branches present). The final block may comprise at least one fully connected layer.

The final output layer may comprise a classifier, such as a softmax, sigmoid or tanh classifier. Different classifiers may be suitable for different types of output; for example, a sigmoid classifier may be suitable where the output is a binary classifier. The neural network of the present disclosure may be configured to predict which analogue circuit design architecture is likely to work based on at least one of the circuit performance requirement and the manufacturing requirement for the analogue circuit to specify a specific set of manufacturing process related rules. The output of the neural network may provide an indication of a probability that an analogue circuit design architecture will meet both the at least one manufacturing requirement and the at least one circuit performance requirement. For example, the output of the neural network may provide an indication of a probability that an analogue circuit design architecture will meet the at least one circuit performance requirement with the knowledge that it will definitely meet the at least one manufacturing requirement. The circuit design architectures may be prioritised or ranked according to their determined probability, so that, for example, when a parent block as described above selects a circuit design architecture from among a plurality of circuit design architectures that will satisfy the at least one manufacturing requirement, the one that is selected first the one that has been determined to have the highest probability of meeting the at least one circuit performance requirement.

Figure 7:
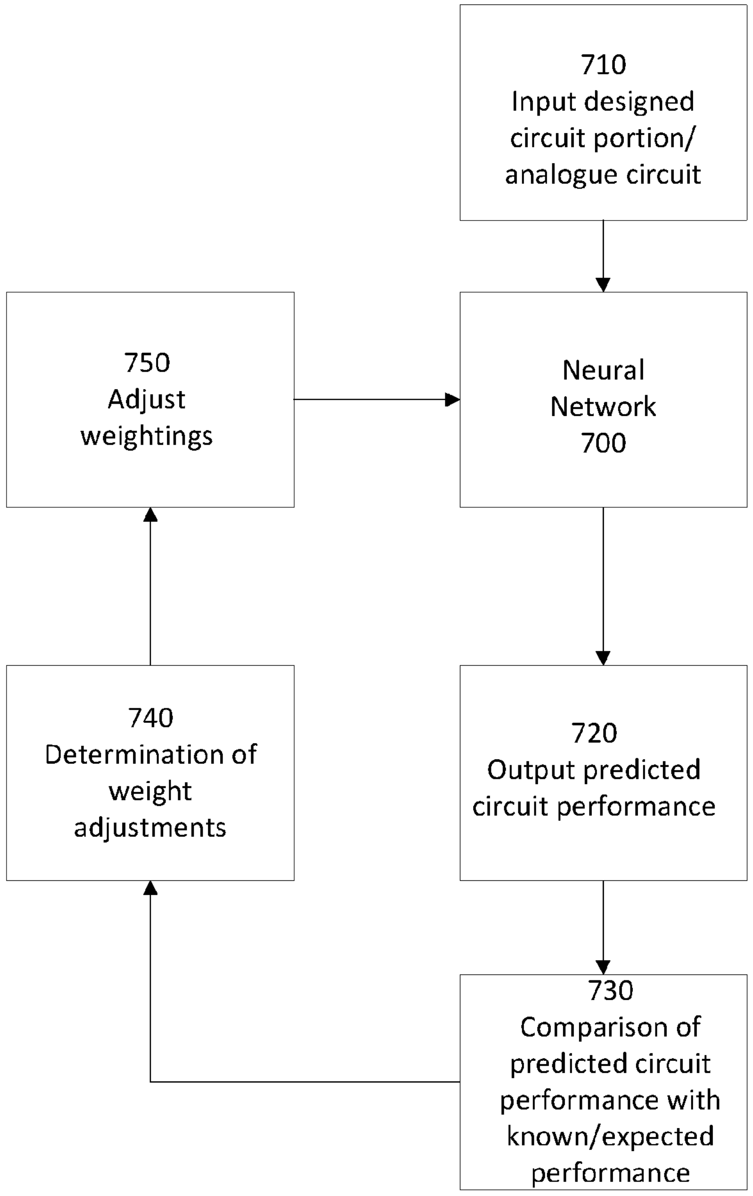
FIG. 7 shows a schematic of an example method for training a machine learning model to rank architectures.

FIG. 7 shows a schematic of an example method for training a machine learning model to estimate the probability of an analogue circuit design architecture meeting at least one manufacturing requirement and at least one circuit performance requirement. The neural network 700 is configured to take in as an input 710 designed circuit portions and/or analogue circuits. The designed circuit portion and/or analogue circuits may be stored in a database and may have been designed using the computer implemented model described above with reference to FIGS. 1A to 6B, using a hierarchical model of primary design units and secondary design units. The circuit portions and/or analogue circuits may vectorised and/or encoded, such as by using one-hot encoding to provide a binary format. This input is then fed into a set of 3D layers in the neural network. There are several features of this network which may be varied as training of the network proceeds. For each neuron, there may be a plurality of weightings, each of which is applied to a respective input stream for output data from neurons in preceding layers. These weightings are variables which can be modified to provide a change to the output of the neural network. These weightings may be modified in response to training so that they provide more accurate data. In response to having trained these weightings, the modified weightings are referred to as having been 'learned'. Additionally, the size and connectivity of the layers may be dependent upon the typical input data for the network; although, these too may be a variable which may be modified and learned during training, including the reinforcement of connections.

To train the network, e.g. to learn values for the weightings, these weightings are assigned an initial value. These initial values may essentially be random; however, to improve training of the network, a suitable initialisation for the values may be applied such as a Xavier/Glorot initialisation. Such initialisations may inhibit situations from occurring in which initial random weightings are too great or too small, and the neural network can never properly be trained to overcome these initial prejudices. This type of initialisation may comprise assigning weightings using a distribution having a zero mean but a fixed variance.

Once the weightings have been assigned, training object data may be fed or input 710 into the neural network 700. This may comprise operating the neural network on known designed circuits (and/or circuit portions) and corresponding circuit performances. Based on this information, a back-propagation optimisation method, for example using gradient descent (e.g. stochastic gradient descent) and loss functions is performed on the network to compare 730 predicted 720 circuit performances with expected or known circuit performances for that circuit portion/analogue circuit. The expected or known circuit performances may have been obtained, for example, using a virtual test bench. Algorithms such as mini-batch gradient descent, RMSprop, Adam, Adadelta and Nesterov may be used during this process. This may enable an identification of how much each different point (neuron) or path (between neurons in subsequent layers) in the network is contributing to determining an incorrect score, thus enabling a determination 740 of any weight adjustments that need to be made. The weightings may then be adjusted 750 according to the error calculated. For example, to minimise or remove the contribution from neurons which contribute, or contribute the most, to an incorrect determination.

After an iteration of training the network with different pairs of designed circuits (and/or circuit portions) and corresponding circuit performances, the weightings may be updated 750, and this process may be repeated a large number of times. To inhibit the likelihood of overtraining the network, training variables such as learning rate and momentum may be varied and/or controlled to be at a selected value. Additionally, regularisation techniques such as L2 or dropout may be used which reduce the likelihood of different layers becoming over-trained to be too specific for the training data, without being as generally applicable to other, similar data. Likewise, batch normalisation may be used to aid training and improve accuracy. In general, the weightings are adjusted so that the network would, if operated on the same training data again, produce the expected outcome. Although, the extent to which this is true will be dependent on training variables such as learning rate.

It is to be appreciated that increasing the depth of neural networks may cause problems when training, e.g. due to vanishing gradient problems, and it may also provide slower networks. However, the present disclosure may enable the provision of a network having increased depth and accuracy without sacrificing the ability to adequately train the network.

The depth of the network used may be selected to provide a balance between accuracy and the time taken to provide an output. Increasing the depth of the network may provide increased accuracy although it may also increase the time taken to provide an output. Use of a branched structure (as opposed to in a convolutional neural network) may enable sufficient training of the network to occur as depth of the network increases, which in turn provides for an increased accuracy of the network.

It will be understood in the context of the present disclosure that a non-exhaustive list of example analogue parameters that may form basis of the criteria include: Noise tolerance; Power Supply Rejection Ratio (PSRR); Common Mode Range—Input (Input CMR); Common Mode Range—Output (Output CMR); Linearity; Maximum Offset; Bandwidth; Minimum Slew Rate; Intrinsic Delay; Minimum phase margin; Active Power consumption; Static power consumption; IP3 point; Filter centre-frequency; Filter band-pass range; Load Step response; Line step response; Output Accuracy; Noise figure; Calibration range; Noise floor; SNR; ENOB; SINAD; Output frequency range; Jitter— ptp; Jitter— RMS; Output ripple ptp; Total Harmonic Distortion; Start-up time; Channel isolation; Reference voltage; Gain error; Offset error; Gain drift.

It will also be understood that the design units (such as the primary, secondary and tertiary design units) may be implemented in software or hardware, for example as dedicated circuitry. For example, the design units may be implemented as part of a computer system. The computer system may include a bus or other communication mechanism for communicating information data, signals, and information between various components of the computer system. The components may include an input/output (I/O) component that processes a user (i.e., sender, recipient, service provider) action, such as selecting keys from a keypad/keyboard, selecting one or more buttons or links, etc., and sends a corresponding signal to the bus. The I/O component may also include an output component, such as a display and a cursor control (such as a keyboard, keypad, mouse, etc.). A transceiver or network interface may transmit and receives signals between the computer system and other devices, such as another user device, a merchant server, or a service provider server via a network. In one embodiment, the transmission is wireless, although other transmission mediums and methods may also be suitable. A processor, which can be a micro-controller, digital signal processor (DSP), or other processing component, processes these various signals, such as for display on the computer system or transmission to other devices via a communication link. The processor may also control transmission of information, such as cookies or IP addresses, to other devices.

The components of the computer system may also include a system memory component (e.g., RAM), a static storage component (e.g., ROM), and/or a disk drive (e.g., a solid-state drive, a hard drive). The computer system performs specific operations by the processor and other components by executing one or more sequences of instructions contained in the system memory component.

Logic may be encoded in a computer readable medium, which may refer to any medium that participates in providing instructions to a processor for execution. Such a medium may take many forms, including but not limited to, non-volatile media, volatile media, and transmission media. In various implementations, non-volatile media includes optical or magnetic disks, volatile media includes dynamic memory, such as a system memory component, and transmission media includes coaxial cables, copper wire, and fiber optics. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by a computer system. In various other embodiments of the present disclosure, a plurality of computer systems 600 coupled by a communication link to a network (e.g., such as a LAN, WLAN, PTSN, and/or various other wired or wireless networks, including telecommunications, mobile, and cellular phone networks) may perform instruction sequences to practice the present disclosure in coordination with one another.

It will also be understood that aspects of the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

In the context of the present disclosure other examples and variations of the apparatus and methods described herein will be apparent to a person of skill in the art.

The invention claimed is:

1. An analogue circuit design apparatus, the apparatus comprising at least one design unit comprising a processor and a communications interface, the processor being configured to:

(a) control the communications interface to receive information representing technical requirements for the analogue circuit, wherein the technical requirements comprise (i) at least one circuit performance requirement, and (ii) at least one manufacturing requirement for the analogue circuit to satisfy a specific set of manufacturing process related rules;

(b) identify, based on the received information, a plurality of potential analogue circuit design architectures, for satisfying the circuit performance requirement, that will satisfy the at least one manufacturing requirement;

(c) select, as a current analogue circuit design architecture, an initial analogue circuit design architecture from among the plurality of potential analogue circuit design architectures, wherein the selection of the initial analogue circuit design is dependent on the set of manufacturing process related rules;

(d) produce a current design for the analogue circuit that satisfies the current analogue circuit design architecture;

(e) determine, for the current design for the analogue circuit, whether the current design will meet the at least one circuit performance requirement; in the event that the current design for the analogue circuit is determined not to meet the circuit performance requirement:

(f) select a further analogue circuit design architecture as the current analogue circuit design architecture, wherein the selection of the further analogue circuit design architecture is dependent on the set of manufacturing process related rules, and (g) repeat steps (d) and (e); and (h) in the event that the current design for the analogue circuit design architecture is determined to meet the circuit performance requirement, output a design for the analogue circuit.

2. The analogue circuit design apparatus of claim 1, wherein the processor is further configured to:

(i) compare, for each current design for the analogue circuit, the current design to the at least one circuit performance requirement and the set of manufacturing process related rules;

(j) select a further analogue circuit design architecture as the current analogue circuit design architecture, wherein the selection of the further analogue circuit design architecture is dependent on the set of manufacturing process related rules, and (k) repeat steps (d) and (e) to produce a plurality of produced analogue circuit designs; and (l) choose and output a design for the analogue circuit from the plurality of produced analogue circuit designs based on the comparison of the plurality of produced analogue circuit designs to the at least one circuit performance requirement and the set of manufacturing process related rules.

3. The analogue circuit design apparatus of claim 1 wherein the selection of the analogue circuit design architecture at step (c) and/or step (f) is based on a prioritisation of the plurality of potential architectures that creates a prioritised list of potential analogue circuit design architectures that have been determined to meet the set of manufacturing process related rules.

4. The analogue circuit design apparatus of claim 1 wherein the apparatus comprises a primary design unit and a secondary design unit, wherein the primary design unit is configured to:

(m) identify, based on the received information, the plurality of potential analogue circuit design architectures, for satisfying the circuit performance requirement, that will satisfy the manufacturing requirement; and (n) select, as the current analogue circuit design architecture, the initial analogue circuit design architecture from among the plurality of potential analogue circuit design architectures, wherein each circuit design architecture comprises a respective plurality of circuit portions;

(o) determine, for each circuit portion of the plurality of circuit portions, respective circuit performance requirements for that circuit portion, wherein the respective circuit performance requirements for each circuit portion are determined based on the specific set of manufacturing process related rules; and (p) provide the respective circuit performance requirements for each circuit portion to at least one of a plurality of secondary design units; and wherein each of the plurality of secondary design units of the analogue circuit design apparatus is configured to:

(q) design a respective circuit portion of the plurality of circuit portions based on the circuit performance requirements for that respective circuit portion provided by the primary design unit; and (r) output a resulting initial design of the respective circuit portion; wherein the primary design unit is further configured to:

(s) receive a respective design for each circuit portion from each of the plurality of secondary design units; and (t) produce the current analogue circuit design for the analogue circuit that satisfies the current analogue circuit design architecture based on the respective designs for each circuit portion; wherein the primary design unit is further configured to:

(u) simulate an analogue circuit based on the current analogue circuit design to produce at least one simulation output;

(v) verify whether or not the analogue circuit meets the circuit performance requirement, and when the analogue circuit meets the circuit performance requirement, output the generated design; and when the analogue circuit does not meet the circuit performance requirement:

select a further analogue circuit design architecture as the current analogue circuit design architecture, wherein the selection of the further analogue circuit design is dependent on the set of manufacturing process related rules; and repeat steps (d) to (e) and (m) to (v).

5. The analogue circuit design apparatus of claim 4, wherein the primary design unit is further configured to:

(w) simulate an analogue circuit based on the current analogue circuit design to produce at least one simulation output;

(x) verify whether or not the analogue circuit meets the circuit performance requirement for the analogue circuit, and when the analogue circuit meets the circuit performance requirement, output the generated design; and when the analogue circuit does not meet the circuit performance requirement: determine, for at least one affected circuit portion of the plurality of circuit portions, revised circuit performance requirements for that affected circuit portion based on the simulation output and the circuit performance requirement; provide, to at least one corresponding secondary design unit, the revised circuit performance requirements for each affected circuit portion; receive a respective updated design of each affected circuit portion from the at least one corresponding secondary design unit; update the current design of the analogue circuit with the respective updated design of each affected circuit portion; and repeat steps (w) to (x) for the updated set of designs;

wherein each of the plurality of secondary design units is configured to adapt the design of the respective portion based on the simulation output by adapting the design of the respective portion based on a difference between the simulation output and the circuit performance requirements.

6. The analogue circuit design apparatus of claim 4, wherein after at least an initial design of a given circuit portion has been completed by at least another one of the secondary design units, at least one of the secondary design units is configured to adapt the current analogue circuit design based on a context of its corresponding circuit portion, the context comprising circuit performance requirements generated based on the completed design of the given circuit portion completed by the at least another one of the secondary design units.

7. The analogue circuit design apparatus of claim 6 wherein each of the secondary design units is configured to repeat the step of adapting the design of a further circuit portion in the event that the modification of the design of another circuit portion of the plurality of circuit portions causes a change of context for that further circuit portion.

8. The analogue circuit design apparatus of claim 6, wherein the apparatus is configured to obtain the context by simulating the performance of the given circuit portion.

9. The analogue circuit design apparatus of claim 4, wherein, after at least an initial design of a given circuit portion has been completed by at least another one of the secondary design units, at least one of the secondary design units is configured to adapt its output initial design based on a context of its corresponding circuit portion, the context comprising circuit performance requirements generated based on the completed design of the given circuit portion completed by the at least another one of the secondary design units.

10. The analogue circuit design apparatus of claim 9, wherein each of the secondary design units is configured to repeat the step of adapting the design of a further circuit portion only in the event that the change in context is greater than a selected threshold level of change in context.

11. A method of designing an analogue circuit, the method comprising, at a design unit comprising a processor and a communications interface:

(a) controlling the communications interface to receive information representing technical requirements for the analogue circuit, wherein the technical requirements comprise (i) at least one circuit performance requirement, and (ii) at least one manufacturing requirement for the analogue circuit to satisfy a specific set of manufacturing process related rules;

(b) identifying, based on the received information, a plurality of potential analogue circuit design architectures, for satisfying the circuit performance requirement, that will satisfy the at least one manufacturing requirement;

(c) selecting, as a current analogue circuit design architecture, an initial analogue circuit design architecture from among the plurality of potential analogue circuit design architectures, wherein the selection of the initial analogue circuit design is dependent on the set of manufacturing process related rules;

(d) producing a current design for the analogue circuit that satisfies the current analogue circuit design architecture;

(e) determining, for the current design for the analogue circuit design architecture, whether the current design will meet the at least one circuit performance requirement; in the event that the current design for the analogue circuit design architecture is determined not to meet the circuit performance requirement:

(f) selecting a further analogue circuit design architecture as the current analogue circuit design architecture, wherein the selection of the further analogue circuit design architecture is dependent on the set of manufacturing process related rules, and (g) repeating steps (d) and (e); and (h) in the event that the current design for the analogue circuit design architecture is determined to meet the circuit performance requirement, outputting a design for the analogue circuit.

12. The method of claim 11, further comprising:

(i) comparing, for the current design for the analogue circuit, the current design to the at least one circuit performance requirement and the set of manufacturing process related rules;

(j) selecting, a further analogue circuit design architecture as the current analogue circuit design architecture, wherein the selection of the further analogue circuit design architecture is dependent on the set of manufacturing process related rules, and (k) repeating steps (d) and (e) to produce a plurality of produced analogue circuit designs; and (l) choosing and outputting a design for the analogue circuit from the plurality of produced analogue circuit designs based on the comparison of the plurality of produced analogue circuit designs to the at least one circuit performance requirement and the set of manufacturing process related rules.

13. The analogue circuit design method of claim 11, wherein the selection of the analogue circuit design architecture at step (c) and/or step (f) is based on a prioritisation of the plurality of potential architectures that creates a prioritised list of potential analogue circuit design architectures that have been determined to meet the set of manufacturing process related rules; the method further comprising:

at a primary design unit:

(m) identifying, based on the received information, the plurality of potential analogue circuit design architectures, for satisfying the circuit performance requirement, that will satisfy the manufacturing requirement; and (n) selecting, as the current analogue circuit design architecture, the initial analogue circuit design architecture from among the plurality of potential analogue circuit design architectures, wherein each circuit design architecture comprises a respective plurality of circuit portions;

(o) determining, for each circuit portion of the plurality of circuit portions, respective circuit performance requirements for that circuit portion, wherein the respective circuit performance requirements for each circuit portion are determined based on the specific set of manufacturing process related rules; and (p) providing the respective circuit performance requirements for each circuit portion to at least one of a plurality of secondary design units; at each of the plurality of secondary design units:

(q) designing a respective circuit portion of the plurality of circuit portions based on the circuit performance requirements for that respective circuit portion provided by the primary design unit; and (r) outputting a resulting initial design of the respective circuit portion; further comprising, at the primary design unit:

(s) receiving a respective design for each circuit portion from each of the plurality of secondary design units; and (t) producing the current analogue circuit design for the analogue circuit that satisfies the current analogue circuit design architecture based on the respective designs for each circuit portion.

14. The analogue circuit design method of claim 13, further comprising at the primary design unit:

(u) simulating an analogue circuit based on the current analogue circuit design to produce at least one simulation output;

(v) verifying whether or not the analogue circuit meets the circuit performance requirement, and when the analogue circuit meets the circuit performance requirement, outputting the generated design; and when the analogue circuit does not meet the circuit performance requirement: selecting, a further analogue circuit design architecture as the current analogue circuit design architecture, wherein the selection of the further analogue circuit design is based on a prioritisation of the plurality of potential architectures that is dependent on the set of manufacturing process related rules; and repeating steps (d) to (e) and (m) to (v).

15. The analogue circuit design method of claim 13, further comprising, at the primary design unit:

(w) simulating an analogue circuit based on the current analogue circuit design to produce at least one simulation output;

(x) verifying whether or not the analogue circuit meets the circuit performance requirement for the analogue circuit, and when the analogue circuit meets the circuit performance requirement, outputting the generated design; and when the analogue circuit does not meet the circuit performance requirement: determining, for at least one affected circuit portion of the plurality circuit portions, revised circuit performance requirements for that affected circuit portion based on the simulation output and the circuit performance requirement; providing, to at least one corresponding secondary design unit, the revised circuit performance requirements for each affected circuit portion; receiving a respective updated design of each affected circuit portion from the at least one corresponding secondary design unit; updating the set of designs with the respective updated design of each affected circuit portion; and repeating steps (w) to (x) for the updated set of designs.

16. The analogue circuit design method of claim 15, further comprising adapting, at each of the plurality of secondary design units, the design of the respective portion based on the simulation output by adapting the design of the respective portion based on a difference between the simulation output and the circuit performance requirements.

17. The analogue circuit design method of claim 13, further comprising adapting, after at least an initial design of a given circuit portion has been completed by at least another one of the secondary design units, the output initial design of at least one of the secondary design units based on a context of its corresponding circuit portion, the context comprising circuit performance requirements generated based on the completed design of the given circuit portion completed by the at least another one of the secondary design units.

18. The analogue circuit design method of claim 13, further comprising adapting, after at least an initial design of a given circuit portion has been completed by at least another one of the secondary design units, the output initial design of at least one of the secondary design units based on a context of its corresponding circuit portion, the context comprising circuit performance requirements generated based on the completed design of the given circuit portion completed by the at least another one of the secondary design units;

repeating, at each of the secondary design units, the step of adapting the design of a further circuit portion in the event that the modification of the design of another circuit portion of the plurality of circuit portions causes a change of context for that further circuit portion; and repeating, at each of the secondary design units, the step of adapting the design of a further circuit portion only in the event that the change in context is greater than a selected threshold level of change in context;

wherein the context is obtained by simulating the performance of the given circuit portion.

19. The method of claim 11, further comprising fabricating an analogue circuit to the output design.

20. A computer readable non-transitory storage medium comprising a program for a computer configured to cause a processor to perform the method of claim 11.

* * * * *